(12) United States Patent
Aoki

(10) Patent No.: US 12,238,441 B2
(45) Date of Patent: Feb. 25, 2025

(54) IMAGING SENSOR AND IMAGING APPARATUS

(71) Applicant: CANON KABUSHIKI KAISHA, Tokyo (JP)

(72) Inventor: Kunitoshi Aoki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 173 days.

(21) Appl. No.: 18/051,445

(22) Filed: Oct. 31, 2022

(65) Prior Publication Data

US 2023/0137640 A1    May 4, 2023

(30) Foreign Application Priority Data

Nov. 4, 2021 (JP) ................................. 2021-180309

(51) Int. Cl.
| | |
|---|---|
| *H04N 25/77* | (2023.01) |
| *G01S 17/14* | (2020.01) |
| *G01S 17/894* | (2020.01) |
| *H01L 31/107* | (2006.01) |
| *H04N 25/766* | (2023.01) |
| *H04N 25/78* | (2023.01) |

(52) U.S. Cl.
CPC ........... *H04N 25/77* (2023.01); *H04N 25/766* (2023.01)

(58) Field of Classification Search
CPC ............................ H04N 25/77; H04N 25/766; H04N 25/772; H04N 25/773; H04N 25/47; H04N 25/771; H04N 25/78; H01L 31/107; G01S 17/14; G01S 17/894
See application file for complete search history.

(56) References Cited

U.S. PATENT DOCUMENTS

| | | | |
|---|---|---|---|
| 9,210,350 B2* | 12/2015 | Dai ....................... | H04N 25/587 348/295 |
| 10,903,385 B2* | 1/2021 | Miyamoto ............ | H01L 31/107 |
| 12,108,174 B2* | 10/2024 | Tojima ................. | H04N 25/589 |
| 2015/0163429 A1* | 6/2015 | Dai ....................... | H04N 25/581 348/295 |
| 2016/0010986 A1* | 1/2016 | Sun ....................... | G01S 17/894 356/5.01 |
| 2019/0288150 A1* | 9/2019 | Miyamoto ............ | H01L 31/107 |
| 2022/0166948 A1* | 5/2022 | Kelly ..................... | H04N 23/71 |
| 2023/0156358 A1* | 5/2023 | Tojima ................. | H04N 25/589 |

FOREIGN PATENT DOCUMENTS

WO      2019/065174 A1    4/2019

\* cited by examiner

*Primary Examiner* — Marly S Camargo
(74) *Attorney, Agent, or Firm* — CANON U.S.A., INC. IP DIVISION

(57) ABSTRACT

The processing unit of the sensor includes a time counter and pixel counters. The number of lines is reduced by sharing output lines with the pixel counters and the time counter. In addition, readout time is reduced by transposing an output sequence of pixel count values and time count values across Bayer units depending on a state of saturation of a pixel.

10 Claims, 15 Drawing Sheets

IMAGING SENSOR AND IMAGING APPARATUS

BACKGROUND

Technical Field

The aspect of the embodiments relates to an imaging sensor and an imaging apparatus.

Description of the Related Art

There has been known a photoelectric conversion apparatus configured to digitally count the number of photons reaching an avalanche photodiode, and to output a value of the counted number from a pixel in the form of a digital signal subjected to photoelectric conversion. Digitalization of pixel signals delivers significant advantages in light of improvement in noise resistance and convenience of signal arithmetic processing. Hence, the imaging sensors formed by arranging the pixels each configured to output a digital signal subjected to photoelectric conversion have begun to be spread. Regarding such an imaging sensor, there has been known a method of measuring time in a case where the counted number of photons reaches a threshold within such time shorter than one frame, and deriving the number of photons per frame from the time information and the number of photons reaching the threshold (see U.S. Pat. No. 9,210,350, for example).

The imaging apparatus of the related art requires an increase in resolution of a time counter in order to conduct processing at high accuracy. The time counter with high time resolution leads to an increase in circuit scale. This makes it difficult to provide every pixel with its own time counter. In this regard, a time measurement device disclosed in International Laid-Open No. 2019/065174 suppresses an increase in circuit scale by coupling one time counter to multiple pixels.

However, in addition to such a counter circuit for retaining the information on the pixels and the time, readout lines for reading the count values also have a large percentage in terms of the circuit scale of the imaging sensor. Particularly, an increase in number of bits in order to improve the resolution of the time counter leads to an increase in number of reading lines accordingly, and the reading lines will occupy a large area in the circuits of the imaging sensor.

SUMMARY

A sensor including: pixels each provided with a conversion unit to detect incidence of photons; and pulse processing units to process pulses generated by detection of the photons with the conversion units, the pixels and the pulse processing units being two-dimensionally arranged. Here, each pulse processing unit includes a time counter configured to count clocks from start of exposure for one frame, and pixel counters each configured to count number of the pulses from the start of exposure for the one frame, and the time counter and the pixel counters share an output line, and exclusively output count values, respectively.

Further features of the disclosure will become apparent from the following description of exemplary embodiments with reference to the attached drawings.

DESCRIPTION OF THE EMBODIMENTS

Hereinafter, with reference to the attached drawings, the disclosure is explained in detail in accordance with exemplary embodiments. Configurations shown in the following embodiments are merely exemplary and the disclosure is not limited to the configurations shown schematically.

First Embodiment

Figure 1:
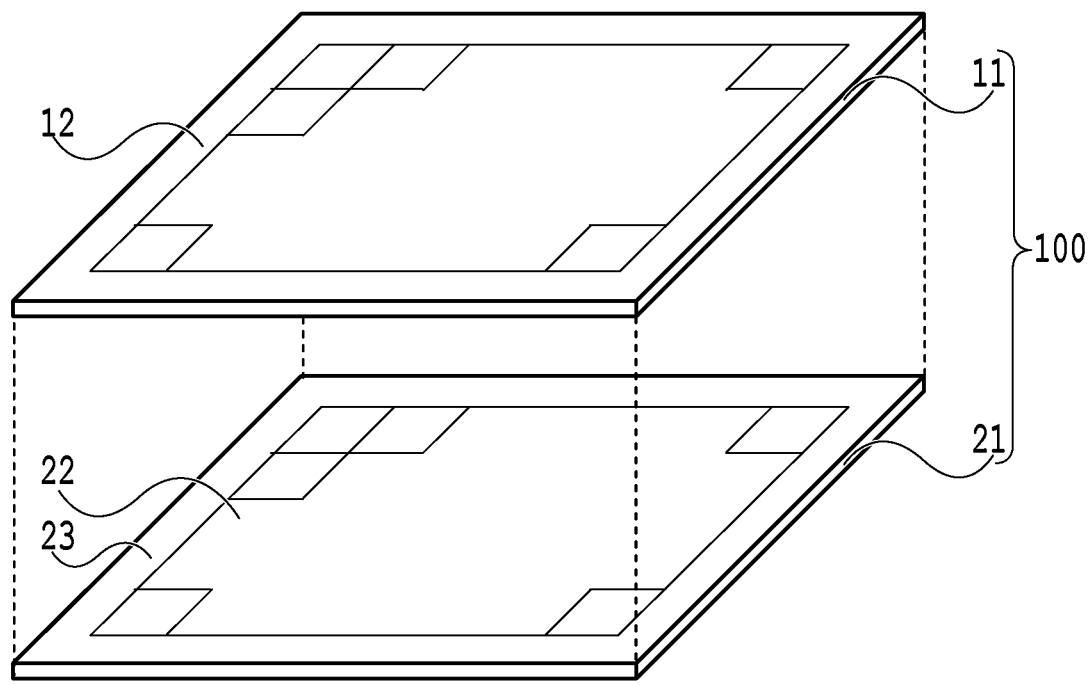
FIG. 1 is a diagram showing a configuration example of an imaging sensor according to an embodiment of the present disclosure.

FIG. 1 is a diagram showing a configuration example of an imaging sensor according to an embodiment of the present disclosure. An imaging sensor 100 is formed by stacking two chips, namely, a sensor chip 11 and a circuit chip 21, and electrically coupling the two chips to each other. The sensor chip 11 includes a pixel region 12. The circuit chip 21 includes a pixel circuit region 22 configured to process signals detected in the pixel region 12, and a readout circuit region 23 for reading signals out of the pixel circuit region 22.

Figure 2:
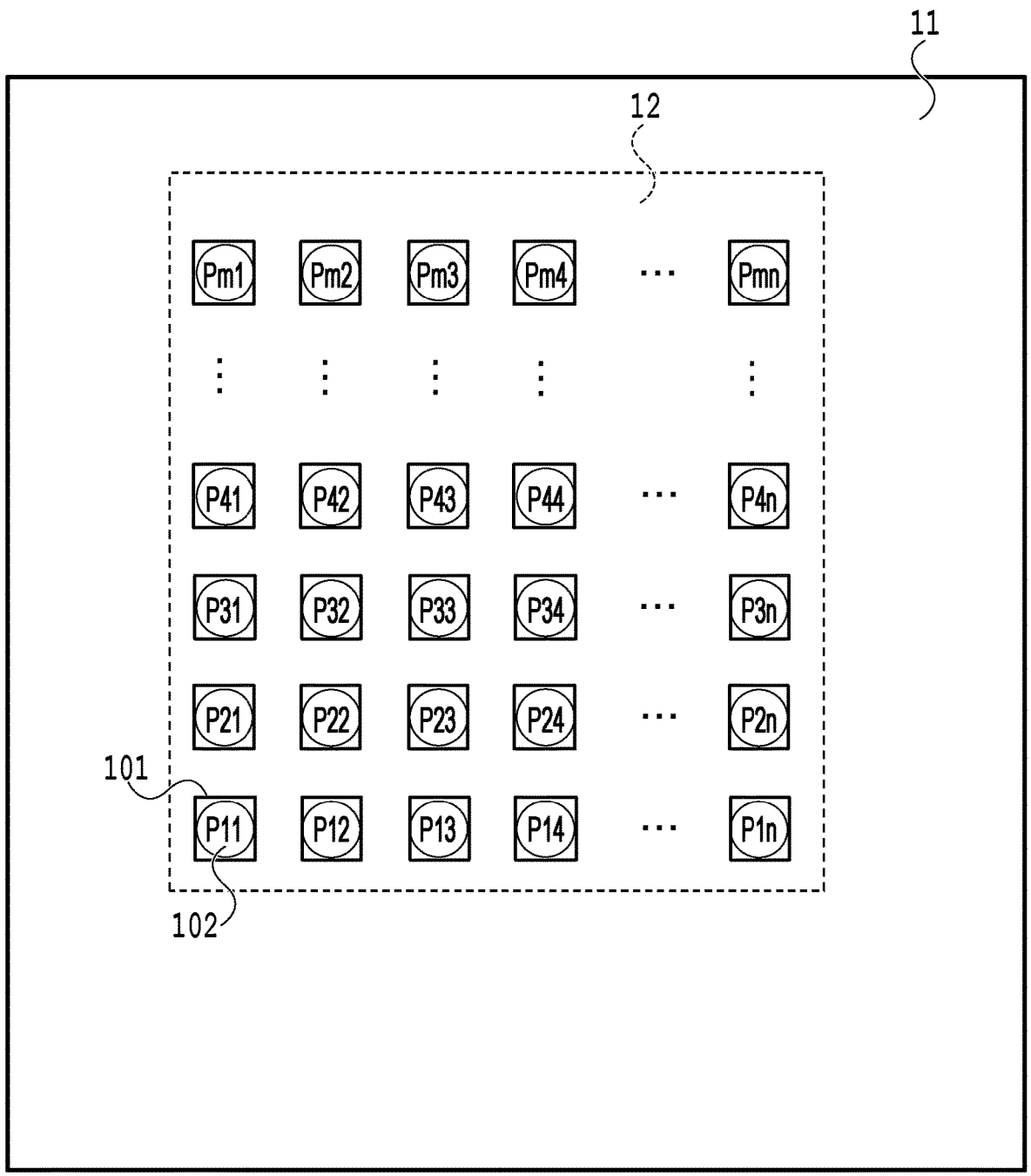
FIG. 2 is a diagram showing a configuration example of a sensor chip according to the embodiment.

FIG. 2 is a diagram showing a configuration example of the sensor chip 11 according to the present embodiment. The pixel region 12 of the sensor chip 11 includes pixels 101 which are two-dimensionally arranged in directions of multiple rows and columns. Each pixel 101 is provided with a photoelectric conversion unit 102 that includes an avalanche photodiode (hereinafter abbreviated as APD). FIG. 2 shows part of m×n pieces of the pixels 101 arranged in m rows from a first row to an m-th row and in n columns from a first column to an n-th column together with codes indicating respective row numbers and column numbers. For instance, a pixel 101 located on a first row and on a third column is provided with a code "P13". Note that the number of rows and the number of columns of the pixel array that forms the pixel region 12 are not limited to specific numbers.

Figure 3:
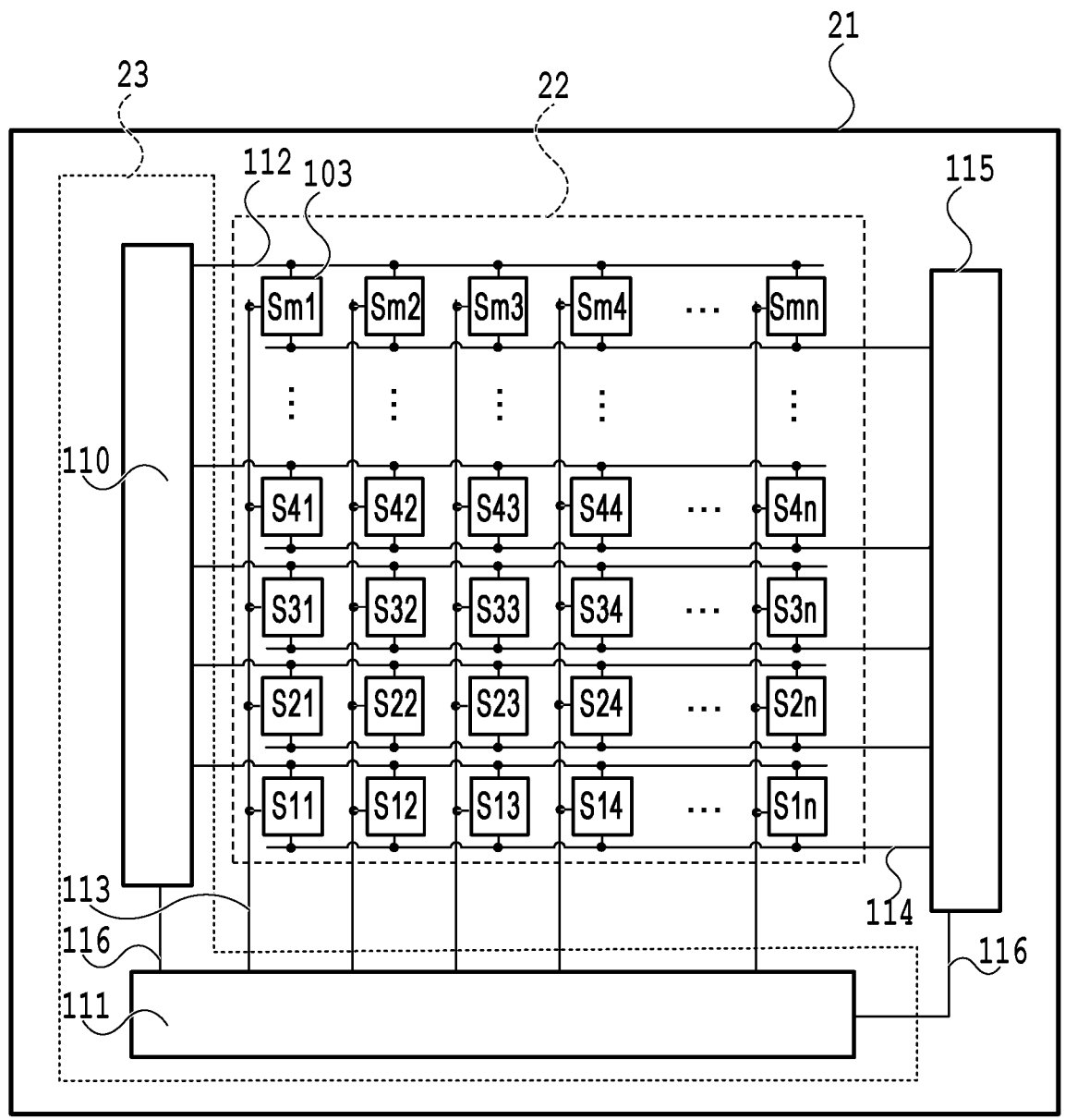
FIG. 3 is a diagram showing a configuration example of a circuit chip according to the embodiment.

FIG. 3 is a diagram showing a configuration example of the circuit chip 21 according to the present embodiment. The circuit chip 21 includes the pixel circuit region 22 and the readout circuit region 23.

The pixel circuit region 22 includes signal processing units 103 which are two-dimensionally arranged in the directions of multiple rows and columns. FIG. 3 shows part of m×n pieces of the signal processing units 103 arranged in m rows from the first row to the m-th row and in n columns from the first column to the n-th column together with codes indicating respective row numbers and column numbers. For instance, a signal processing unit 103 located on the first row and on the third column is provided with a code "S13". Note that the number of rows and the number of columns of the signal processing unit array that forms the pixel circuit region 22 are not limited to specific numbers.

The readout circuit region 23 includes a vertical control pulse generation unit 110 and a horizontal control pulse generation unit 111.

A vertical control line 112 and a data output line 114 are provided in such a way as to extend in a first direction (a lateral direction in FIG. 3) on each row of the signal processing unit array in the pixel circuit region 22. The vertical control lines 112 and the data output lines 114 are coupled, respectively, to the signal processing units 103 that are arranged in the first direction. The first direction of extension of the vertical control lines 112 may be referred to as a row direction or a horizontal direction in some cases.

A horizontal control line 113 is provided in such a way as to extend in a second direction (a vertical direction in FIG. 3) on each column of the signal processing unit array in the pixel circuit region 22. The horizontal control lines 113 are coupled, respectively, to the signal processing units 103 that are arranged in the second direction. The second direction of extension of the horizontal control lines 113 may be referred to as a column direction or a vertical direction in some cases.

The vertical control line 112 on each row is coupled to the vertical control pulse generation unit 110. The vertical control pulse generation unit 110 supplies a control signal for driving the signal processing unit 103 to the signal processing unit 103 through the vertical control line 112. In the meantime, the horizontal control line 113 on each column is coupled to the horizontal control pulse generation unit 111. The horizontal control pulse generation unit 111 supplies a control signal for driving the signal processing unit 103 to the signal processing unit 103 through the horizontal control line 113. The vertical control pulse generation unit 110, the horizontal control pulse generation unit 111, and a signal readout unit 115 are coupled to one another through readout control lines 116. A control signal for driving the horizontal control pulse generation unit 111 and the signal readout unit 115 synchronously with the signal processing unit 103 is supplied from the vertical control pulse generation unit 110 through the readout control line 116. The vertical control pulse generation unit 110 may generate the control signal based on a not-illustrated external trigger or generate the control signal based on an internal signal.

The data output line 114 on each row is coupled to the signal readout unit 115. The data output lines 114 are signal lines for transmitting pieces of data retained by the signal processing unit 103. The pieces of data include pixel count values and time count values, which will be described later in detail. The signal readout unit 115 obtains the pieces of data from the data output lines 114 in response to the readout control lines 116 by the vertical control pulse generation unit 110. Together with signals corresponding to pixel signals, the signal readout unit 115 outputs the pieces of data as output signals of the imaging sensor to an image processing unit of an imaging apparatus such as a digital camera.

In this configuration example, a set of the vertical control line 112, the horizontal control line 113, and the data output line 114 controls one signal processing unit 103 and reads the data therefrom. Instead, this set may control two or more signal processing units collectively as a Bayer unit.

Figure 4:
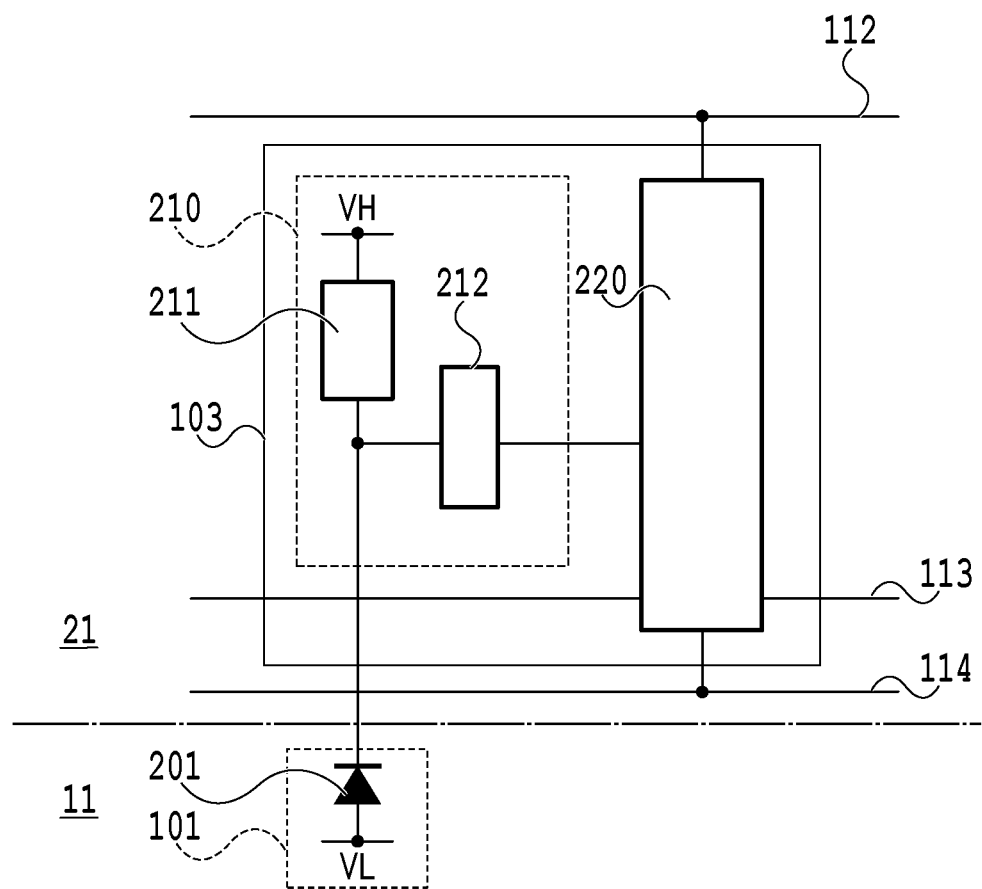
FIG. 4 is an example of an equivalent circuit diagram and a block diagram of a pixel and a signal processing unit.

FIG. 4 is an example of an equivalent circuit diagram and a block diagram of a pixel 101 in FIG. 2 and a signal processing unit 103 in FIG. 3. The pixel 101 in the sensor chip 11 includes an APD 201 serving as a photoelectric conversion unit. In a case where light is incident on the APD 201, electric charge pairs corresponding to the incident light are generated by photoelectric conversion. A voltage VL (a first voltage) is supplied to an anode of the APD 201. Meanwhile, a voltage VH (a second voltage) higher than the voltage VL to be supplied to the anode is supplied to a cathode of the APD 201. A reverse bias voltage to cause the APD 201 to perform an avalanche multiplication operation is supplied to the anode and the cathode. By establishing the state of supplying the aforementioned bias voltage, the electric charges generated by the incident light cause the avalanche multiplication, thereby generating an avalanche current.

In the case of supplying the reverse bias voltage, there are a Geiger mode to conduct an operation at a potential difference between the anode and the cathode being a potential difference larger than a breakdown voltage, and a linear mode to conduct an operation at a potential difference between the anode and the cathode being a potential difference in the vicinity of the breakdown voltage or equal to or below the breakdown voltage.

The APD to be operated in the Geiger mode will be referred to as an SPAD. Here, the voltage VL (the first voltage) is set to −30 V and the voltage VH (the second voltage) is set to 1 V, for example.

The signal processing unit 103 in the circuit chip 21 is formed from a pulse generation unit 210 and a pulse processing unit 220.

The pulse generation unit 210 includes a quenching element 211 and a waveform shaping unit 212. The pulse generation unit 210 generates a pulse by shaping a variation of output from the APD 201 that detects incidence of the light.

The quenching element 211 is coupled between a power supply that supplies the voltage VH and the cathode of the APD 201. The quenching element 211 has a function to replace a variation of the avalanche current generated by the APD 201 with a voltage signal. The quenching element 211 functions as a load circuit (a quench circuit) at the time of signal multiplication by the avalanche multiplication, and has a role for suppressing the avalanche multiplication by constraining the voltage to be supplied to the APD 201 (a quench operation).

The waveform shaping unit 212 outputs a pulse signal by shaping a variation of the electric potential at the cathode of the APD 201 obtained at the time of detection of photons. The waveform shaping unit 212 adopts an inverter circuit or a buffer circuit, for example.

The pulse processing unit 220 receives photon detection pulses generated by the pulse generation unit 210 to count the number of photon detection pulses, thereby measuring exposure time from the start of exposure to a point at which a counter reaches a predetermined value. More details will be described below with reference to FIG. 5.

Figure 5:
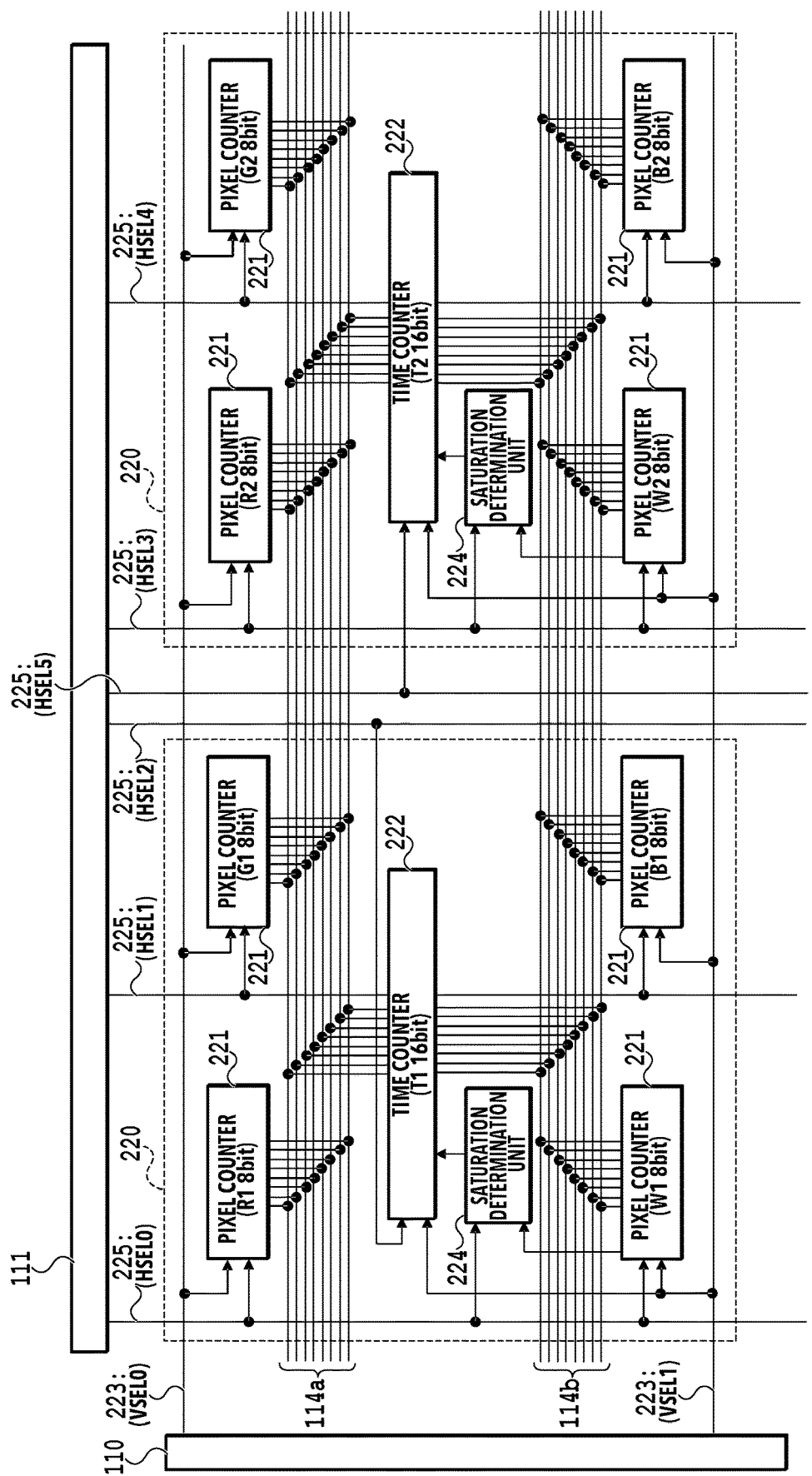
FIG. 5 is a diagram showing a configuration example of pulse processing units according to a first embodiment.

FIG. 5 is a diagram showing a configuration example of the pulse processing units 220 according to the first embodiment. FIG. 5 shows two pulse processing units 220 on the same row which are adjacent to each other. Each pulse processing unit 220 is formed from a pixel counter 221, a time counter 222, and a saturation determination unit 224. In the first embodiment, a four-pixel structure formed from RGBW that includes a W (white) pixel having higher sensitivity in addition to general RGB pixels will be defined as one Bayer unit. The pulse processing unit 220 is formed from four pixel counters corresponding to the respective pixels, and one time counter shared by the Bayer unit.

Each pixel counter 221 counts the pulse signals, which are outputted from the not-illustrated pulse generation unit 210 of the corresponding pixel, starting from a point of initiation of exposure for one frame. The pixel counters 221 are provided to the four pixels, respectively. Each pixel counter 221 is an 8-bit counter, for instance.

The saturation determination unit 224 detects that the pixel counter 221 (W1, W2) for the W pixel having the highest sensitivity reaches a predetermined threshold, and notifies the time counter 222 (T1, T2) in the Bayer unit of a value 0 in a case of non-saturation or of a value 1 in a case of saturation. In the first embodiment, a saturation value (255) of the 8-bit counter is used as NOP to be described later. Therefore, a value (254) that is smaller by 1 from the saturation value will be used as the threshold for determination of the saturation. However, the threshold may be set to an intermediate value such as 127 or 63 instead.

The time counter 222 counts time clocks starting from the point of initiation of exposure for one frame, and stops counting in a case where the saturation determination unit 224 notifies that the pixel counter 221 (W1, W2) for the W pixel reaches the saturation value within a period of one frame. The time counter 222 does not stop counting unless the saturation determination unit 224 notifies that the pixel counter 221 reaches the saturation value within the period of one frame. One time counter 222 (T1, T2) is provided to each Bayer unit, and the time counter 222 is a 16-bit counter, for instance. The time counter 222 (T1, T2) counts clock edges of time clocks (TCLK) supplied from the vertical control pulse generation unit 110 through the vertical control line 112.

As for control of the pixel counters 221, the time counters 222, and the saturation determination units 224, control such as start, stop, and resetting is carried out for each row by using not-illustrated various control signals to be supplied from the vertical control pulse generation unit 110 through the vertical control line 112.

After the exposure for one frame is completed, the values of the pixel counters and the time counters are outputted to the data output line 114 to be described later.

The data output lines 114 serve as two 8-bit parallel buses extending in the first direction. A first data output line 114a representing upper 8 bits is coupled to 8-bit output terminals of the pixel counters 221 (R1, R2) for R pixels and to 8-bit output terminals of the pixel counters 221 (G1, G2) for G pixels, which are arranged in the horizontal direction. A second data output line 114b representing lower 8 bits is coupled to 8-bit output terminals of the pixel counters 221 (W1, W2) for W pixels and to 8-bit output terminals of the pixel counters 221 (B1, B2) for B pixels, which are arranged in the horizontal direction. Moreover, in the first embodiment, output terminals of the time counters 222 (T1, T2) shared in the Bayer units are split into terminals for upper 8 bits and terminals for lower 8 bits, and these terminals are coupled to the data output lines 114a and 114b that correspond to the respective pixel counters. By sharing the data output lines for reading out the pixel counters and the time counters as described above, it is possible to decrease the number of lines and to reduce the circuit scale.

Figure 6:
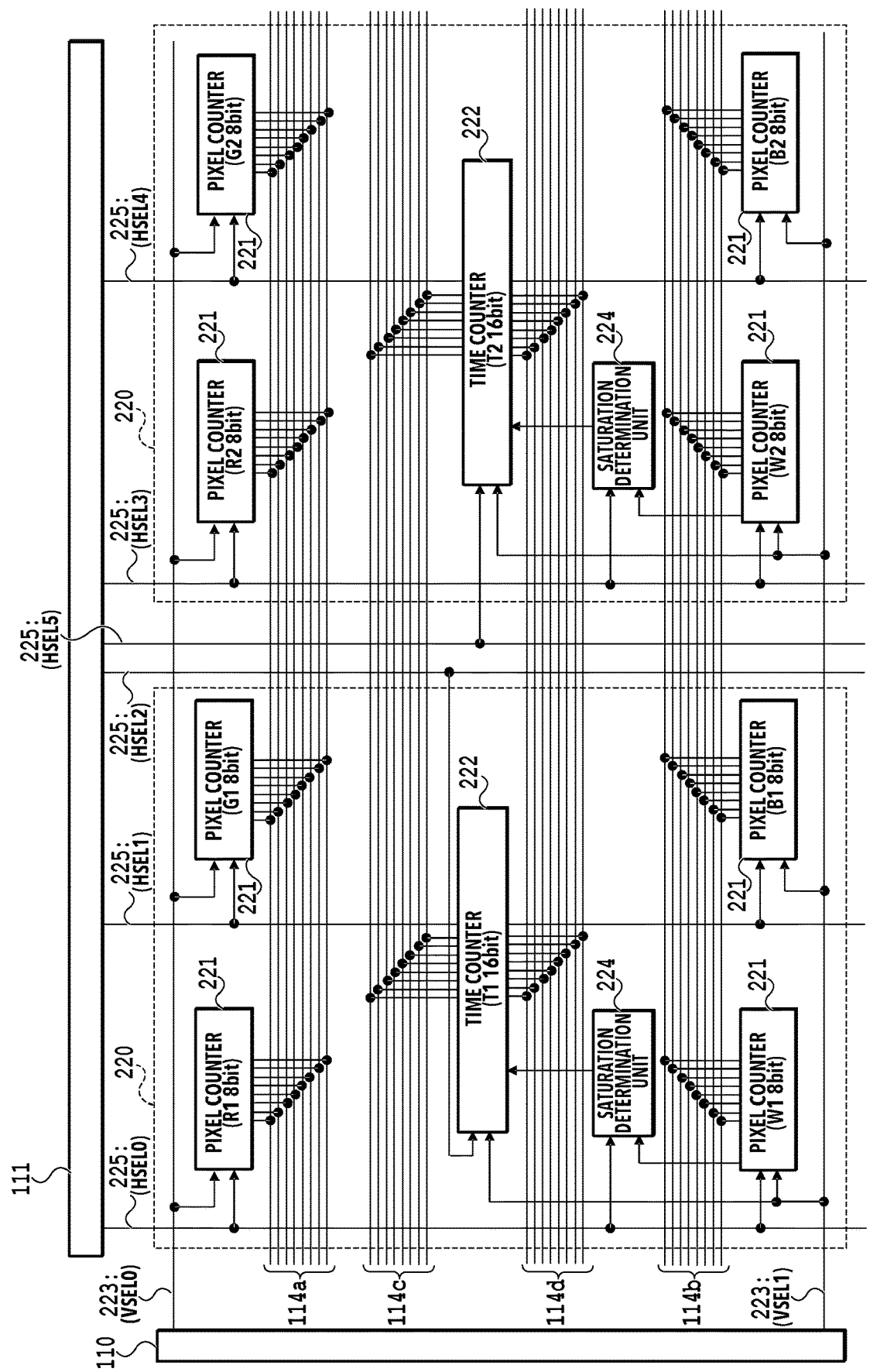
FIG. 6 is a diagram showing a configuration of output lines of pulse processing units of a related art.

A configuration of output lines of a pulse processing unit of a related art is shown in FIG. 6 for the sake of comparison. Output lines of the pixel counters 221 are the same as the configuration shown in FIG. 5, which serve as two 8-bit parallel buses including the data output lines 114a and 114b. In addition, 16-bit data output lines 114c and 114d are to be separately provided as output lines of the time counters 222. This increase in number of lines leads to an increase in circuit scale. Here, the number of bits of each of the counters and the number of lines are not limited to particular values.

The output of the count value from each counter is controlled by the vertical control pulse generation unit 110 and the horizontal control pulse generation unit 111 in FIG. 3. Of the vertical control lines 112 and the horizontal control lines 113, a control signal is supplied to each counter through a row select line 223 (VSEL 0, 1) and a column select line 225 (HSEL 0 to 5). Electric connection or disconnection between each counter output terminal and the corresponding data output line 114 is switched in accordance with this control signal.

Figure 7:
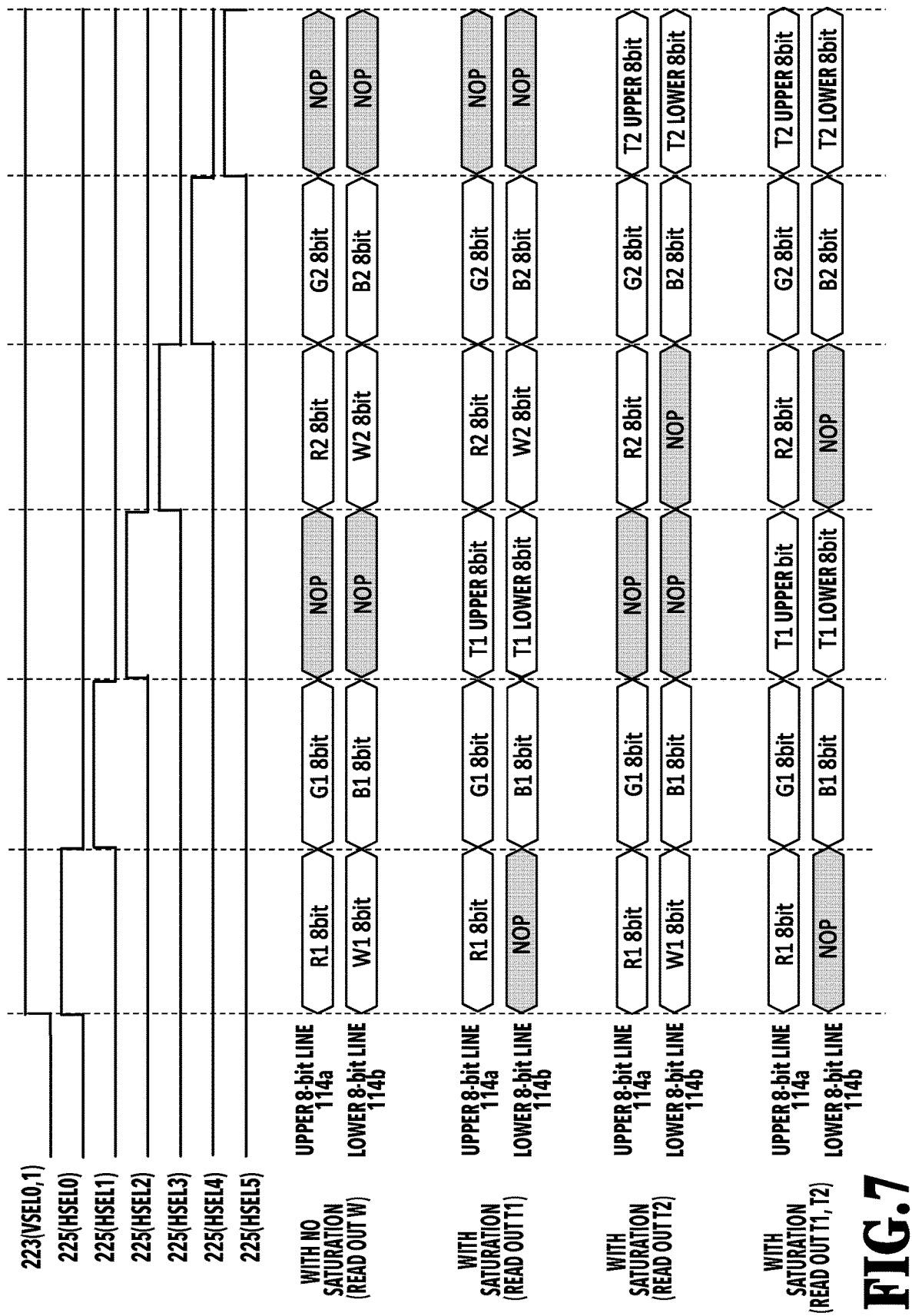
FIG. 7 is a diagram showing an output sequence according to a first embodiment.

FIG. 7 shows an output sequence of the pixel counters 221 and the time counters 222 according to the first embodiment. This configuration is designed to perform readout from every two rows (one Bayer RGBW pixel unit) by using the two 8-bit parallel buses. First, the vertical control pulse generation unit 110 asserts the row select lines 223 (VSEL 0, VSEL 1) of the vertical control lines 112, thus activating the output from the first row and the second row. Subsequently, the horizontal control pulse generation unit 111 asserts the horizontal control lines 113 one cycle by one cycle sequentially from the column select line 225 (HSEL 0) on. In the first embodiment, the pixel counters 221 and the time counters 222 share the data output lines 114a and 114b. Accordingly, the column select lines 225 output in a time-divisional fashion depending on the asserted cycles so as to avoid output conflicts. To be more precise, assuming that n=0, 3, 6, and so on, the count values are outputted from the pixel counters 221 at cycles of assertion of the select lines HSEL (n) and HSEL (n+1), and the count value is outputted from the time counter 222 at a cycle of assertion of the select line HSEL (n+2). The values outputted to the data output lines 114a and 114b vary depending on whether or not the pixel counters 221 (W1, W2) of the W pixels (which may be hereinafter collectively referred to as "W pixel counters" as appropriate; the same applies to the RGB pixels) are saturated.

In the case where the W pixel counters are not saturated, the R pixel counters use the data output line 114a of the upper 8-bit line at the cycle of assertion of the select line HSEL 0, and the W pixel counters output the count values by using the data output line 114b of the lower 8-bit line at the cycle of assertion of the select line HSEL 0. At the cycle of assertion of the select line HSEL 1, the G pixel counters output the count values by using the data output line 114a while the B pixel counters output the count values by using the data output line 114b. At the cycle of assertion of the select line HSEL 2, the time counters 222 are not required to output anything in particular, and may therefore output a bit code (a 255 fixed value) that corresponds to NOP, for example.

In the case where the W pixel counter 221 (W1) of the W pixel is saturated, the R pixel counters output the count values by using the data output line 114a at the cycle of assertion of the select line HSEL 0. Here, the W pixel counter 221 (W1) of the W pixel is not required to output anything, and may therefore output NOP, for example. At the cycle of assertion of the select line HSEL 1, the G pixel counters output the count values by using the data output line 114a while the B pixel counters output the count values by using the data output line 114b. At the cycle of assertion of the select line HSEL 2, the time counter 222 (T1) simultaneously outputs the 16-bit count value by using the two data output lines 114a and 114b.

Likewise, in the case where the W pixel counter 221 (W2) of the W pixel is saturated, the W pixel counter 221 (W2) of the W pixel outputs NOP at the cycle of assertion of the select line HSEL 3. At the cycle of assertion of the select line HSEL 5, the time counter 222 (T2) simultaneously outputs the 16-bit count value by using the two data output lines 114a and 114b.

Moreover, in the case where both of the W pixel counters are saturated, the W pixel counters output NOP at the cycles of assertion of the select lines HSEL 0 and HSEL 3. At the cycles of assertion of the select lines HSEL 2 and HSEL 5, the time counters 222 (T1, T2) simultaneously output the 16-bit count values by using the two data output lines 114a and 114b, respectively.

The operation of the output timings based on one Bayer unit has been described above. Thereafter, the output of the count values is repeated in the horizontal direction in accordance with the order of assertion of the select lines HSEL. After completion of the output from the first row and the second row, the output from one frame is completed by asserting the select lines VSEL by two lines, respectively.

The respective count values outputted from the signal processing unit 103 through the data output lines 114 and the signal readout unit 115 are processed by the image processing unit of the not-illustrated imaging apparatus. In the case where the output from the time counter is NOP, for example, the image processing unit determines that the time counter did not saturate, and performs conversion into pixel values by using the count values of the pixel counters of the respective RGB pixels, and displays an image on a display unit of the imaging apparatus and the like. In the case where the output from the time counter is not NOP, the image processing unit determines that the count value therefrom represents the time left before saturation, and calculates a ratio of exposure period/saturation time. By multiplying this ratio by the respective count values of the RGB pixels, it is possible to calculate predicted count values in a case of counting photons to the end of the exposure period. This method enables to obtain the count values larger than pixel counter 8 bits. As a consequence, it is possible to expand a dynamic range of the imaging apparatus. In the meantime, the count values of the unsaturated W pixels may be used for black and while presentation and the like.

As described above, according to the first embodiment, it is possible to reduce the circuit scale of the lines for the time counters by sharing the output line with the pixel counters and the time counters and exclusively outputting the respective count values therefrom.

Second Embodiment

The first embodiment has described the configuration to share the output lines with the pixel counters and the time counters and to perform exclusive output therefrom. However, this configuration is designed to output NOP constantly even in the case of non-saturation. As a consequence, one extra cycle is spent for the readout. A second embodiment will describe a configuration to reduce the readout time by transposing the output sequence of the count values across the Bayer units depending on whether or not the W pixel counter is saturated.

Figure 8:
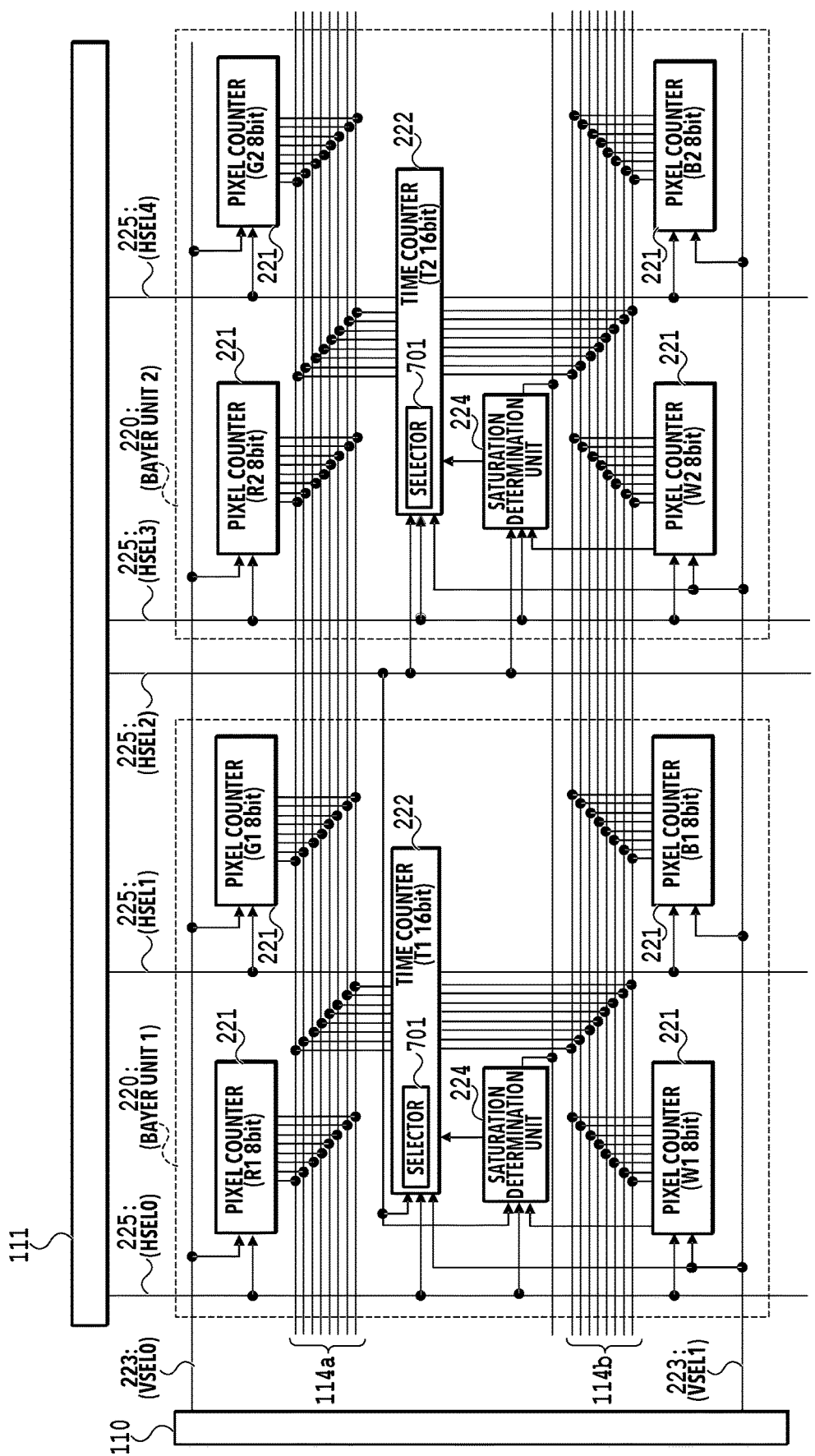
FIG. 8 is a diagram showing a configuration example of pulse processing units according to a second embodiment.

FIG. 8 is a diagram showing a configuration example of the pulse processing units 220 according to the second embodiment. Note that the configuration of the second embodiment is the same as the configuration according to FIGS. 1 to 4 described in conjunction with the first embodiment, and explanations thereof will be omitted. FIG. 8 shows two pulse processing units 220 on the same row which are adjacent to each other. Each pulse processing unit 220 is formed from the pixel counter 221, the time counter 222, and the saturation determination unit 224. The basic operations of the pixel counter 221, the time counter 222, and the saturation determination unit 224 during the exposure period for one frame are the same as those in the first embodiment. Accordingly, the constituents are designated with the same reference signs and explanations thereof will be omitted. Different features from those of the first embodiment will be discussed below.

Each time counter 222 incorporates a horizontal control selector 701, which determines the output of the count values from the column select lines 225 (HSEL) depending on various timings in accordance with the output values from the saturation determination unit 224. In the second embodiment, two Bayer units on the same row and adjacent to each other will be defined as one set of a readout unit. Among the column select lines 225 (HSEL 0 to 4), the select lines HSEL 0 and HSEL 2 are coupled to the horizontal control selector 701 of the time counter 222 (T1) of a Bayer unit 1, and the select lines HSEL 2 and HSEL 3 are coupled to the horizontal control selector 701 of the time counter 222 (T2) of a Bayer unit 2.

Meanwhile, in the second embodiment, the output sequence of the pixel counters and the time counters is transposed depending on a result of determination of saturation to be described later. Accordingly, a saturation determination line 702 to indicate results of determination of saturation by the saturation determination units 224 is added in order to allow the image processing unit of the imaging apparatus at a later stage to perform the determination. Each saturation determination unit 224 uses the saturation determination line 702 to indicate which column select line 225 (HSEL) among the horizontal control lines 113 the output of the result of determination of saturation is to be based on in accordance with the result of determination of saturation conducted by itself.

Figure 9:
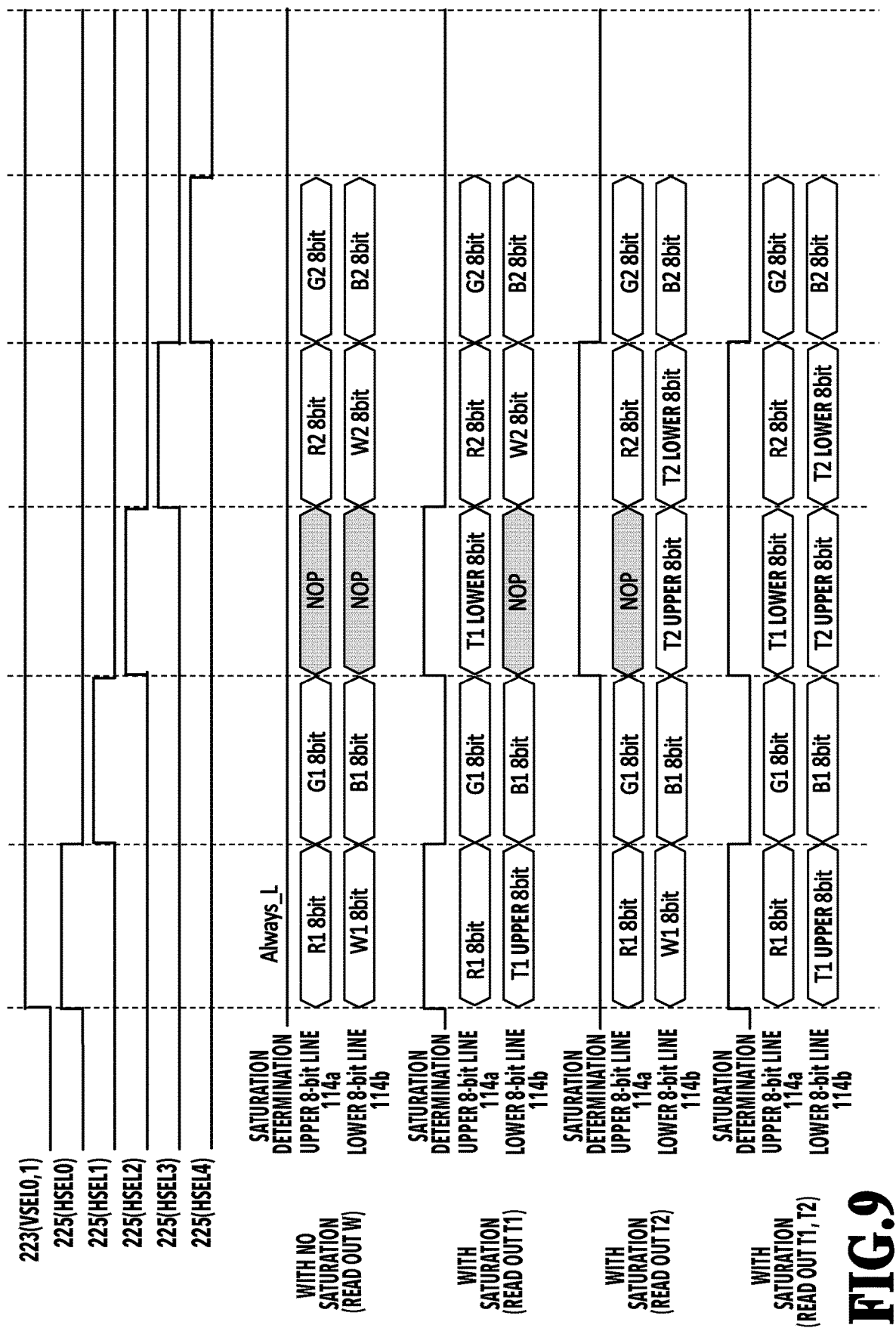
FIG. 9 is a diagram showing an output sequence according to the second embodiment.

FIG. 9 shows an output sequence of the pixel counters 221 and the time counters 222 according to the second embodiment. This configuration is designed to perform readout based on the adjacent two Bayer units on the same row. As with the first embodiment, the vertical control pulse generation unit 110 asserts the row select lines 223 (VSEL 0, VSEL 1) of the vertical control lines 112, thus activating the output from the first row and the second row. Subsequently, the horizontal control pulse generation unit 111 asserts the horizontal control lines 113 one cycle by one cycle sequentially from the column select line 225 (HSEL 0) on. In the second embodiment, the cycles to output the count values from the W pixel counters and the time counters are switched on a Bayer unit basis based on the determination of saturation.

In the case where the W pixel counters are not saturated in both of the Bayer units, the R pixel counter in the Bayer unit 1 outputs the count value by using the data output line 114a of the upper 8-bit line at the cycle of assertion of the select line HSEL 0. At the same time, the pixel counter 221 (W1) of the W pixel outputs the count value by using the data output line 114b of the lower 8-bit line. At the cycle of assertion of the select line HSEL 1, the G pixel counter outputs the count value by using the data output line 114a, while the B pixel counter outputs the count value by using the data output line 114b. At the cycle of assertion of the select line HSEL 2, none of the time counters 222 in these Bayer units have to output anything, and may therefore output an arbitrary value (such as NOP).

Information as to whether or not the W pixel counter in each Bayer unit is saturated is outputted as a serial pattern to the image processing unit at the later stage through the saturation determination line 702. The saturation determination unit 224 in the Bayer unit 1 outputs the result of determination of saturation at the timing of assertion of the select line HSEL 0 or HSEL 2 out of the column select lines 225. For example, the saturation determination unit 224 outputs a value 0 in the case of non-saturation or outputs a value 1 in the case of saturation. The saturation determination unit 224 in the Bayer unit 2 outputs the result of determination of saturation at the timing of assertion of the select line HSEL 2 or HSEL 3 out of the column select lines 225. In the case where the W pixels in both of the Bayer units are not saturated, the saturation determination line 702 is always set to 0 throughout the five cycles of assertion of the select lines HSEL 0 to HSEL 4, and 5-bit serial data "00000" is outputted to the image processing unit at the later stage.

In the case where the pixel counter 221 (W1) of the W pixel in the Bayer unit 1 is saturated, the R pixel counter outputs the count value by using the first data output line 114a at the cycle of saturation of select line HSEL 0. The count value of the pixel counter 221 (W1) of the W pixel is obvious (the saturation value 255) and therefore does not have to be outputted. Instead, upper 8 bits of the time counter 222 (T1) in the Bayer unit 1 are outputted. In this instance, the second data output line 114b is used since the first data output line 114a is used by the R pixel counter. The switching between these lines is controlled by horizontal control selector 701 based on the results from the saturation determination units 224. At the cycle of assertion of the select line HSEL 1, the G pixel counter outputs the count value by using the data output line 114a, while the B pixel counter outputs the count value by using the data output line 114b. At the cycle of assertion of the select line HSEL 2, the time counter 222 (T1) in the Bayer unit 1 outputs the remaining lower 8 bits by using the data output line 114a. At the cycles of assertion of the select lines HSEL 3 and HSEL 4, the count values of the R pixel counter and the G pixel counter in the Bayer unit 2 are outputted to the data output line 114a, while the count values of the W pixel counter and the B pixel counter are outputted to the data output line 114b.

Here, the saturation determination unit 224 in the Bayer unit 1 outputs a result 1 of determination of saturation at the timing of assertion of the select lines HSEL 0 and HSEL 2 out of the column select lines 225. Accordingly, the 5-bit serial data to be outputted from the saturation determination line 702 to the image processing unit at the later stage turns out to be "10100".

In the case where the pixel counter 221 (W2) of the W pixel in the Bayer unit 2 is saturated, the count values of the R pixel counter and the G pixel counter in the Bayer unit 1 are outputted to the data output line 114a at the cycles of assertion of the select lines HSEL 0 and HSEL 1. Meanwhile, the count values of the W pixel counter and the B pixel counter therein are outputted to the data output line 114b. At the cycle of assertion of the select line HSEL 2, the time counter 222 (T2) in the Bayer unit 2 outputs the upper 8 bits by using the data output line 114b. At the cycle of assertion of the select line HSEL 3, the R pixel counter in the Bayer unit 2 outputs the count value by using the data output line 114a. The count value of the pixel counter (W2) of the W pixel is obvious (the saturation value 255) and therefore does not have to be outputted. Instead, the time counter 222 (T2) in the Bayer unit 2 outputs the remaining lower 8 bits. In this instance, the second data output line 114b is used since the first data output line 114a is used by the R pixel counter. The switching between these lines is controlled by horizontal control selector 701 based on the results from the saturation determination units 224. At the cycle of assertion of the select line HSEL 4, the G pixel counter outputs the count value by using the data output line 114a, while the B pixel counter outputs the count value by using the data output line 114b.

Here, the saturation determination unit 224 in the Bayer unit 2 outputs the result 1 of determination of saturation at the timing of assertion of the select lines HSEL 2 and HSEL 3 out of the column select lines 225. Accordingly, the 5-bit serial data to be outputted from the saturation determination line 702 to the image processing unit at the later stage turns out to be "00110".

In the case where the W pixel counters in both of the Bayer units are saturated, the R pixel counter outputs the count value by using the data output line 114a at the cycle of assertion of the select line HSEL 0. The count value of the pixel counter 221 (W1) of the W pixel is obvious (the saturation value 255) and therefore does not have to be outputted. Instead, the time counter 222 (T1) in the Bayer unit 1 outputs the upper 8 bits. In this instance, the second data output line 114b is used since the first data output line 114a is used by the R pixel counter. At the cycle of assertion of the select line HSEL 1, the G pixel counter outputs the count value by using the data output line 114a, while the B pixel counter outputs the count value by using the data output line 114b. At the cycle of assertion of the select line HSEL 2, the time counter 222 (T1) in the Bayer unit 1 outputs the remaining lower 8 bits by using the data output line 114a, while the time counter 222 (T2) in the Bayer unit 2 outputs the upper 8 bits by using the data output line 114b. At the cycle of assertion of the select line HSEL 3, the R pixel counter in the Bayer unit 2 outputs the count value by using the data output line 114a. The count value of the pixel counter (W2) of the W pixel is obvious (the saturation value 255) and therefore does not have to be outputted. Instead, the time counter 222 (T2) in the Bayer unit 2 outputs the remaining lower 8 bits. In this instance, the second data output line 114b is used since the first data output line 114a is used by the R pixel counter. At the cycle of assertion of the select line HSEL 4, the G pixel counter outputs the count value by using the data output line 114a, while the B pixel counter outputs the count value by using the data output line 114b.

Here, the saturation determination unit 224 in the Bayer unit 1 outputs the result 1 of determination of saturation at the timing of assertion of the select lines HSEL 0 and HSEL 2 out of the column select lines 225. Meanwhile, the saturation determination unit 224 in the Bayer unit 2 outputs the result 1 of determination of saturation at the timing of assertion of the select lines HSEL 2 and HSEL 3 out of the column select lines 225. Accordingly, the 5-bit serial data to be outputted from the saturation determination line 702 to the image processing unit at the later stage turns out to be "10110".

The operation of the output timing across the two Bayer units in the second embodiment has been described above. Thereafter, the output of the count values is repeated in the horizontal direction in accordance with the order of assertion of the select lines HSEL. After completion of the output from the first row and the second row, the output from one frame is completed by asserting the select lines VSEL by two lines, respectively.

According to this configuration, the readout of the two Bayer units is completed in five cycles, so that the read time can be reduced by one cycle for every 2 Bayer units as compared to the first embodiment. As a consequence, the number of cycles required for the readout of one frame can be reduced by a half of the number of Bayer units to be read out.

Note that the respective count values thus outputted are received by the not-illustrated image processing unit at the later stage together with the five-bit serial data to be outputted from the saturation determination line 702, and are subjected to data sorting based on the results of determination of saturation. In the case where the serial data from the saturation determination line 702 is "00000" representing that none of the W pixel counters are saturated, the received count values are interpreted as the RGB pixel values in a predetermined order and are used without change. In the case where the W pixel counter is saturated, a determination as to which Bayer unit is saturated is carried out based on the bit pattern of the serial data from the saturation determination line 702. Next, the 8-bit values outputted from the time counter in the form of two separate pieces according to a predetermined order are converted into the original 16-bit signal. In this instance, the W pixel counter is regarded to have the saturation value (255). As described in the first embodiment, the count values of the RGB pixels are corrected by using the values of the time counters each converted into 16 bits.

As described above, according to the second embodiment, it is possible to reduce the circuit scale of the lines for the time counters by transposing the output sequence from the pixel counters and the time counters based on the results of determination of saturation, thereby reducing the readout time.

Third Embodiment

The second embodiment has described the configuration to reduce the readout time by transposing the output sequence of the count values across the Bayer units depending on whether or not the W pixel counter is saturated. However, this configuration requires one extra cycle for outputting an arbitrary value from the time counter in the case where the W pixel counter in any of the Bayer units is not saturated. A third embodiment will describe a configuration to further reduce the readout time by starting the readout of the next Bayer unit one cycle earlier in the case where none of the W pixel counters in the Bayer units are saturated.

Figure 10:
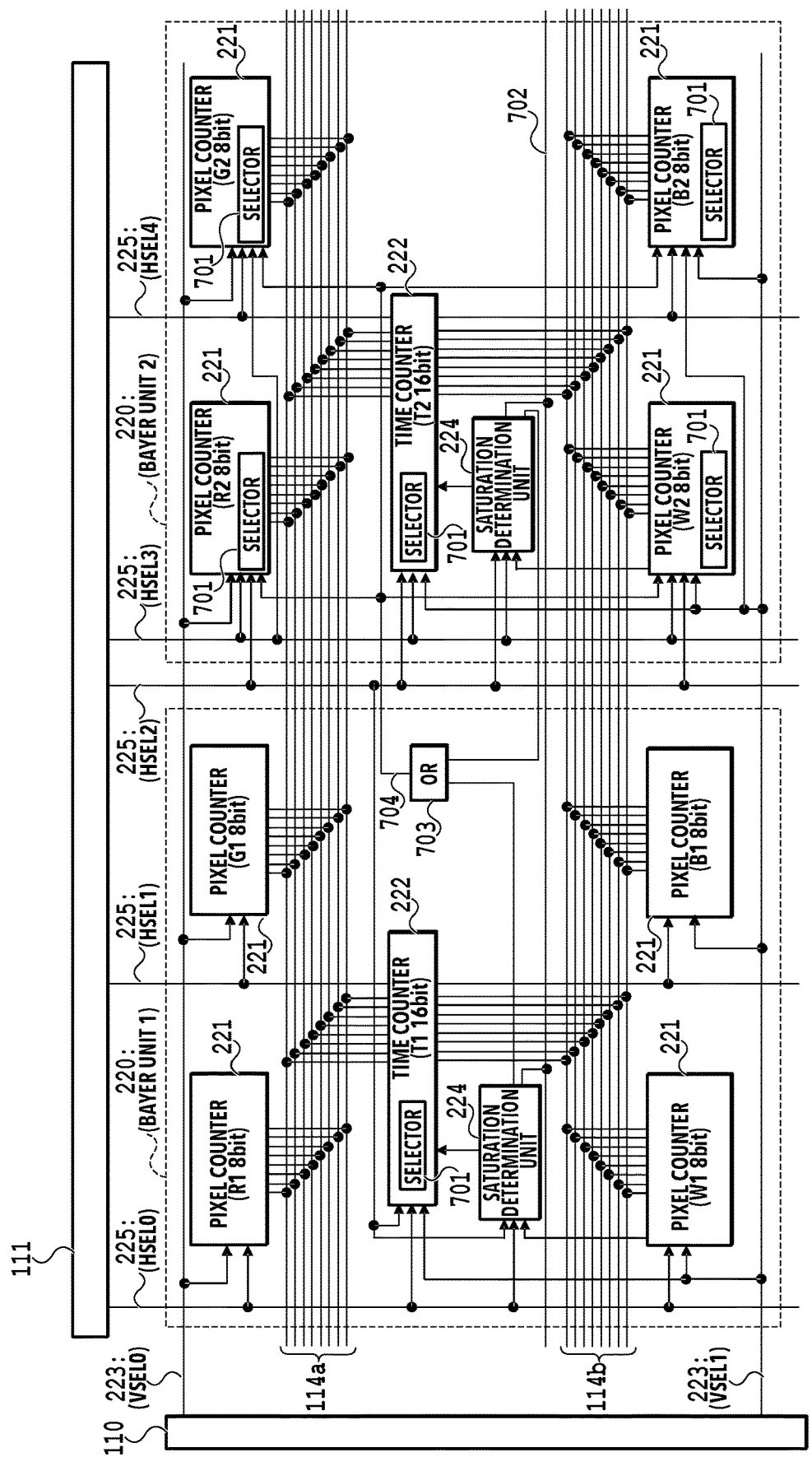
FIG. 10 is a diagram showing a configuration example of pulse processing units according to a third embodiment.

FIG. 10 is a diagram showing a configuration example of the pulse processing units 220 according to the third embodiment. Note that the configuration of the third embodiment is the same as the configuration according to FIGS. 1 to 4 described in conjunction with the first embodiment, and explanations thereof will be omitted. FIG. 10 shows two pulse processing units 220 on the same row which are adjacent to each other. Each pulse processing unit 220 is formed from the pixel counter 221, the time counter 222, and the saturation determination unit 224. The basic operations of the pixel counter 221, the time counter 222, and the saturation determination unit 224 during the exposure period are the same as those in the first embodiment. Accordingly, the constituents are designated with the same reference signs and explanations thereof will be omitted.

Each of the time counters 222 (T1, T2) in both of the Bayer units and the pixel counters 221 in the Bayer unit 2 incorporates the horizontal control selector 701. The horizontal control selector 701 selects the output of the count values from the column select lines 225 (HSEL) depending on various timings in accordance with the output values from the saturation determination unit 224. The two Bayer units will be defined as one set of the readout unit in the third embodiment as well. Among the column select lines 225 (HSEL 0 to 4), the select lines HSEL 0 and HSEL 2 are coupled to the horizontal control selector 701 of the time counter 222 (T1) of the Bayer unit 1, and the select lines HSEL 2 and HSEL 3 are coupled to the horizontal control selector 701 of the time counter 222 (T2) of the Bayer unit 2, respectively. Regarding the horizontal control selectors 701 of the pixel counters 221 in the Bayer unit 2, the select lines HSEL 2 and HSEL 3 are coupled to the pixel counter 221 (R2) of the R pixel and the pixel counter 221 (W2) of the W pixel. Meanwhile, the select lines HSEL 3 and HSEL 4 are coupled to the pixel counter 221 (G2) of the G pixel and the pixel counter 221 (B2) of the B pixel.

Meanwhile, in the third embodiment, the output sequence of the pixel counters is transposed depending on the results of determination of saturation as described later. Accordingly, the saturation determination line 702 to indicate the results of determination of saturation by the saturation determination units 224 is added in order to allow the image processing unit of the imaging apparatus at the later stage to perform the determination. Moreover, a result of logical OR of the output from the saturation determination units 224 in both of the Bayer units is outputted from a saturation determination OR circuit 703. A saturation determination OR signal 704 being the output from this saturation determination OR circuit 703 is coupled to the horizontal control selector 701 for the pixel counters 221 in the Bayer unit 2.

Figure 11:
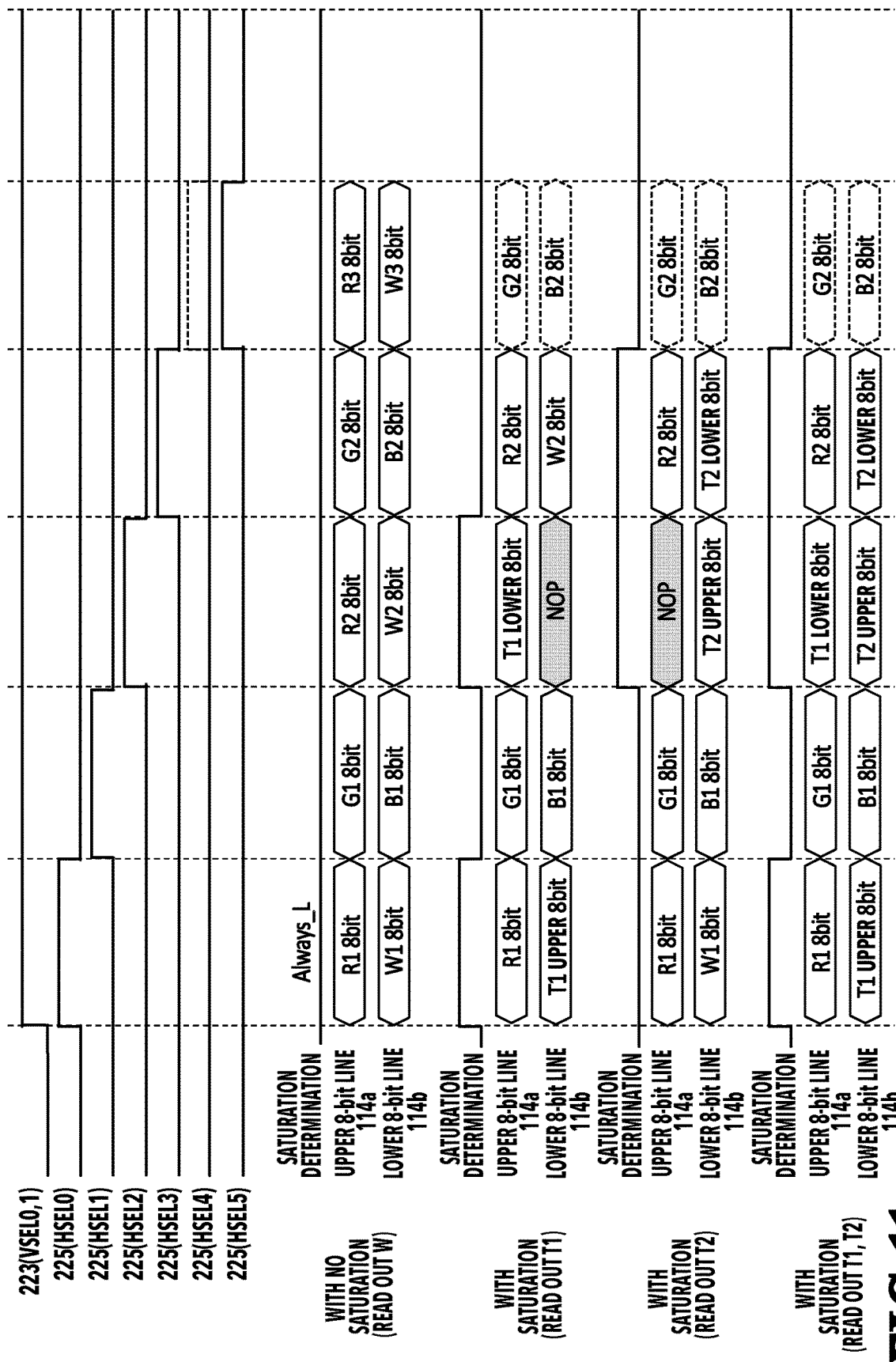
FIG. 11 is a diagram showing an output sequence according to the third embodiment.

FIG. 11 shows an output sequence of the pixel counters 221 and the time counters 222 according to the third embodiment. As with the second embodiment, the third embodiment is designed to perform readout based on the two Bayer units. In the case where the W pixel counters are not saturated in both of the Bayer units, the pixel counter 221 (R1) of the R pixel in the Bayer unit 1 outputs the count value by using the data output line 114a of the upper 8-bit line at the cycle of assertion of the select line HSEL 0. At the same time, the pixel counter 221 (W1) of the W pixel outputs the count value by using the data output line 114b of the lower 8-bit line. At the cycle of assertion of the select line HSEL 1, the G pixel counter outputs the count value by using the data output line 114a, while the B pixel counter outputs the count value by using the data output line 114b. At the cycle of assertion of the select line HSEL 2, none of the time counters 222 in the Bayer units have to output anything. Accordingly, the pixel counter 221 (R2) of the R pixel and the pixel counter 221 (W2) of the W pixel in the Bayer unit 2 can output the count values instead. This is realized by causing the horizontal control selectors 701 of the pixel counter 221 (R2) of the R pixel and of the pixel counter 221 (W2) of the W pixel to select the select line HSEL 2 in the case where the output from the saturation determination OR signal 704 is 0. At the cycle of assertion of the select line HSEL 3, the count values have already been outputted from the R pixel counter and the W pixel counter in the Bayer unit 2. Accordingly, the pixel counter 221 (G2) of the G pixel and the pixel counter 221 (B2) of the B pixel can output the count values. This is realized by causing the horizontal control selectors 701 of the pixel counter 221 (G2) of the G pixel and of the pixel counter 221 (B2) of the B pixel to select the select line HSEL 3 in the case where the output from the saturation determination OR signal 704 is 0.

The next select line HSEL 4 does not have to be asserted since the count values have been outputted from all of the pixel counters 221 in both of the Bayer units during the four cycles of the select lines HSEL 0 to HSEL 3. Accordingly, it is possible to reduce the readout time by one cycle by performing control in such a way as to assert the select line HSEL 5 used for controlling the next Bayer unit 3. As indicated with solid lines in FIG. 11, the count values are outputted from the pixel counter 221 (R3) of the R pixel and the pixel counter 221 (W3) of the W pixel in the next Bayer unit 3 by assertion of the select line HSEL 5.

This is realized by causing the image processing unit at the later stage to monitor the serial data on the saturation determination line 702 and to determine that none of the Bayer units are saturated in the case where the value is 0 at the third cycle in which the select line HSEL 2 is asserted. For example, a not-illustrated control signal may be outputted from a control unit of the imaging apparatus, for instance, to the horizontal control pulse generation unit 111, and an increment value for a built-in horizontal counter that controls the sequence of assertion of the select lines HSEL may be changed from an ordinary value of +1 to a value +2 in the case of the select line HSEL 3.

Meanwhile, since a horizontal scanning period is reduced by one cycle as a consequence of the above-described configuration, a period for asserting the row select lines 223 (VSEL) is reduced by one cycle likewise. This may also be controlled by outputting a not-illustrated control signal from the control unit of the imaging apparatus at the later stage to the vertical control pulse generation unit 110, for example.

As described above, as compared to the configuration of the second embodiment, the third embodiment can start the readout of the next two Bayer units one cycle earlier in the case where the W pixel counters in both of the Bayer units are not saturated. This makes it possible to further reduce the readout time.

In the case where the W pixel counter in one of the Bayer units is saturated or in the case where the W pixel counters in both of the Bayer units are saturated, the count values are read out by spending five cycles in accordance with the same sequence as that in the second embodiment. Specifically, the select lines HSEL 0 to HSEL 4 are asserted. As indicated with dashed lines in FIG. 11, the count values are outputted from the G pixel counter and the B pixel counter in the Bayer unit 2 by asserting the select line HSEL 4. In this instance, a value 1 being the output from the saturation determination OR signal 704 is inputted to the horizontal control selector 701 for the pixel counters 221 in the Bayer unit 2. The R pixel counter and the W pixel counter are selected in such a way as to output the count values based on the select line HSEL 3, and the G pixel counter and the B pixel counter are selected in such a way as to output the count values based on the select line HSEL 4.

The third embodiment has described the configuration to reduce the readout time by transposing the readout sequence of the count values across the Bayer units. Instead, it is possible to perform the control on a Bayer unit basis. Specifically, in the case where the W pixel counter in one Bayer unit is saturated, the counters in the pixel counters and the time counter read out the values by spending three cycles of the select lines HSEL 0 to HSEL 2. In the case where the W pixel counter in the one Bayer unit is not saturated, the values are read out of the pixel counters by spending two cycles of select lines HSEL 0 and HSEL 1. The image processing unit at the later stage monitors the serial data on the saturation determination line 702, and determines that the relevant Bayer unit is not saturated in the case where the value is 0 at the first cycle in which the select line HSEL 0 is asserted. In the case of non-saturation, the horizontal control pulse generation unit 111 is controlled in such a way as to assert the select line HSEL 3 for use in the readout control of the next Bayer unit.

Fourth Embodiment

In the third embodiment, the non-saturation in both of the Bayer units is determined by using the value at the third cycle of the serial data on the saturation determination line 702. However, according to this configuration, the control of the fifth cycle, namely, the control of the first cycle of the next set has to be settled in the fourth cycle right after the determination, and there is time equivalent to one clock of horizontal scanning left before the settlement. The control of the fifth cycle is settled after propagation of the serial data, determination by the image processing unit of the image processing apparatus at the later stage, propagation of an instruction to the horizontal control pulse generation unit 111, and execution of the increment operation, and a certain period of time is therefore required. For this reason, a clock frequency of the horizontal scanning is to be slowed down in a case where the control is not completed within the next fourth cycle. Given the circumstances, a fourth embodiment will describe a configuration to read the count value of the W pixel counter in the Bayer unit in advance so as to determine the presence of saturation earlier.

Figure 12:
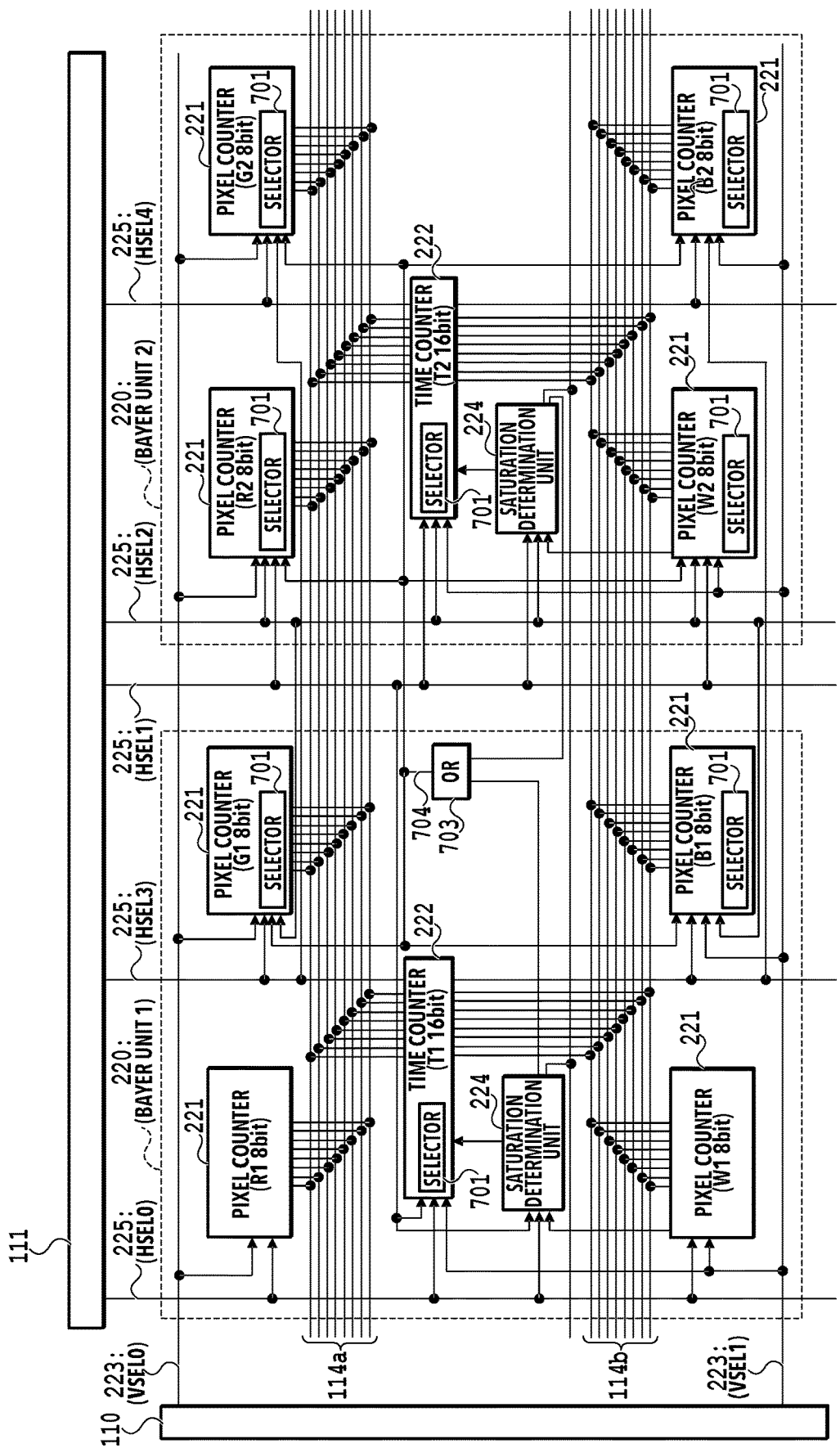
FIG. 12 is a diagram showing a configuration example of pulse processing units according to a fourth embodiment.

FIG. 12 is a diagram showing a configuration example of the pulse processing unit 220 according to the fourth embodiment. Note that the configuration of the fourth embodiment is the same as the configuration according to FIGS. 1 to 4 described in conjunction with the first embodiment, and explanations thereof will be omitted. FIG. 12 shows two pulse processing units 220 on the same row which are adjacent to each other. Each pulse processing unit 220 is formed from the pixel counter 221, the time counter 222, and the saturation determination unit 224. The basic operations of the pixel counter 221, the time counter 222, and the saturation determination unit 224 during the exposure period are the same as those in the first embodiment. Accordingly, the constituents are designated with the same reference signs and explanations thereof will be omitted.

In the fourth embodiment, each of the time counters 222 in both of the Bayer units and the pixel counters 221 in the Bayer unit 2 incorporates the horizontal control selector 701 as with the third embodiment. The horizontal control selector 701 selects the output of the count values from the column select lines 225 (HSEL) depending on various timings in accordance with the output values from the saturation determination unit 224. The two Bayer units will be defined as one set of the readout unit in the fourth embodiment as well. In addition, each of the pixel counter 221 (G1) of the G pixel and the pixel counter 221 (B1) of the B pixel in the Bayer unit 1 also incorporates the horizontal control selector 701. A method of coupling to the column select lines 225 (HSEL 0 to 4) is different from that in the third embodiment. The select lines HSEL 0 and HSEL 1 are coupled to the horizontal control selector 701 of the time counter 222 (T1) of the Bayer unit 1, and the select lines HSEL 1 and HSEL 2 are coupled to the horizontal control selector 701 of the time counter 222 (T2) of the Bayer unit 2, respectively. The select lines HSEL 2 and HSEL 3 are coupled to the G pixel counter and the B pixel counter in the Bayer unit 1. Meanwhile, the select lines HSEL 1 and HSEL 2 are coupled to the R pixel counter and the W pixel counter in the Bayer unit 2, and the select lines HSEL 3 and HSEL 4 are coupled to the G pixel counter and the B pixel counter therein.

Figure 13:
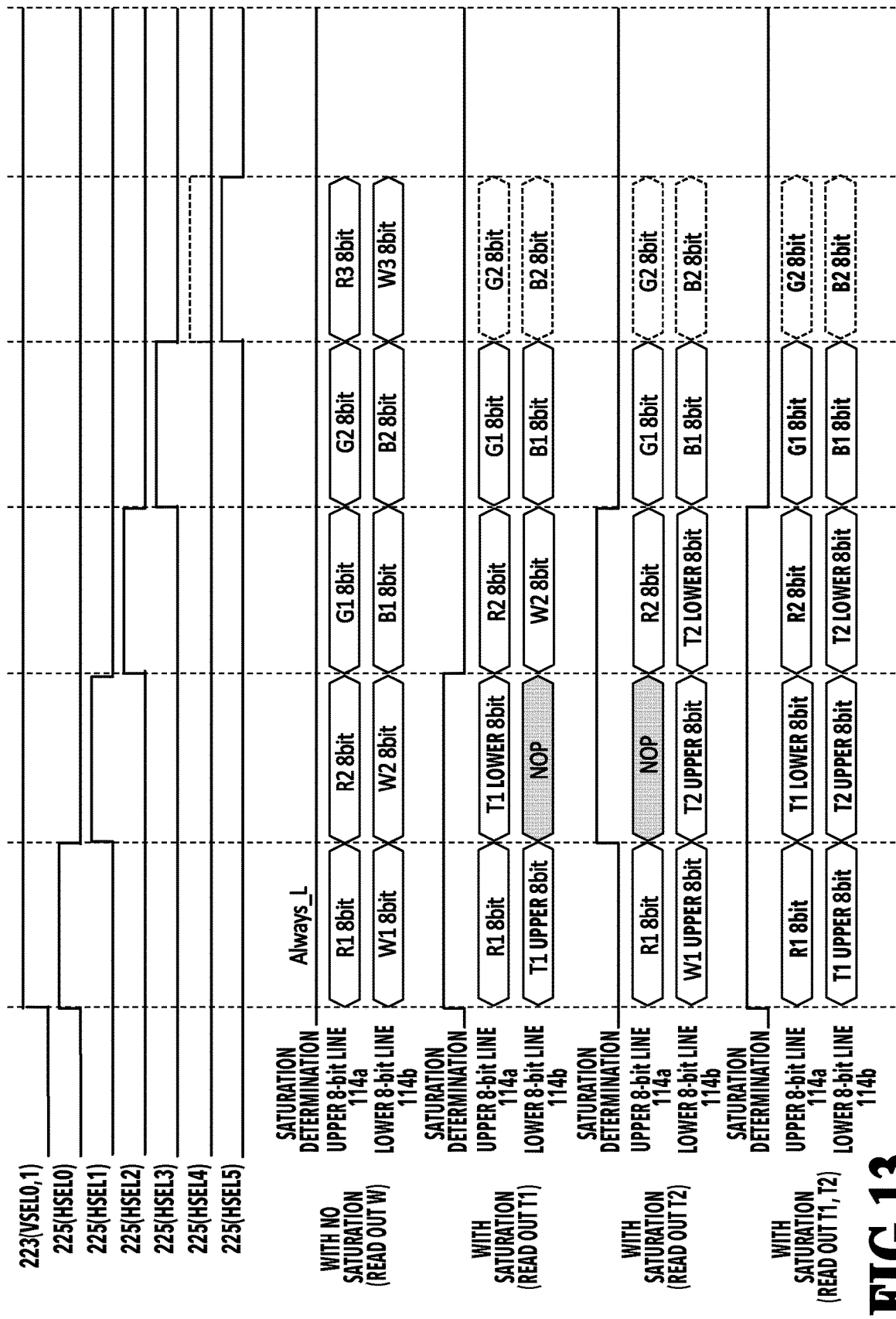
FIG. 13 is a diagram showing an output sequence according to the fourth embodiment.

FIG. 13 shows an output sequence of the pixel counters 221 and the time counters 222 according to the fourth embodiment.

In the case where the W pixel counters are not saturated in both of the Bayer units, the pixel counter 221 (R1) of the R pixel in the Bayer unit 1 outputs the count value by using the data output line 114*a* of the upper 8-bit line at the cycle of assertion of the select line HSEL 0. Meanwhile, the pixel counter 221 (W1) of the W pixel outputs the count value by using the data output line 114*b* of the lower 8-bit line. At the cycle of assertion of the select line HSEL 1, the pixel counter 221 (R2) of the R pixel and the pixel counter 221 (W2) of the W pixel in the Bayer unit 2 output the count values. This is realized by causing the horizontal control selectors 701 of the pixel counter 221 (R2) of the R pixel and of the pixel counter 221 (W2) of the W pixel in the Bayer unit 2 to select the select line HSEL 1 in the case where the output from the saturation determination OR signal 704 is 0. At the cycle of assertion of the select line HSEL 2, none of the time counters in the Bayer units have to output anything. Accordingly, the pixel counter 221 (G1) of the G pixel and the pixel counter 221 (B1) of the B pixel in the Bayer unit 1 output the count values instead. This is realized by causing the horizontal control selectors 701 of the pixel counter 221 (G1) of the G pixel and of the pixel counter 221 (B1) of the B pixel in the Bayer unit 1 to select the select line HSEL 2 in the case where the output from the saturation determination OR signal 704 is 0. At the cycle of assertion of the select line HSEL 3, the pixel counter 221 (G2) of the G pixel and the pixel counter 221 (B2) of the B pixel in the Bayer unit 2 output the count values. This is realized by causing the horizontal control selectors 701 of the pixel counter 221 (G2) of the G pixel and of the pixel counter 221 (B2) of the B pixel in the Bayer unit 2 to select the select line HSEL 3 in the case where the output from the saturation determination OR signal 704 is 0.

The next select line HSEL 4 does not have to be asserted since the count values have been outputted from all of the pixel counters 221 in both of the Bayer units during the four cycles of the select lines HSEL 0 to HSEL 3. Accordingly, it is possible to reduce the readout time by one cycle by performing control in such a way as to assert the select line HSEL 5 used for controlling the next Bayer unit 3. As indicated with solid lines in FIG. 13, the count values are outputted from the pixel counter 221 (R3) of the R pixel and the pixel counter 221 (W3) of the W pixel in the next Bayer unit 3 by asserting the select line HSEL 5.

In the case where the W pixel counter in one of the Bayer units is saturated or in the case where the W pixel counters in both of the Bayer units are saturated, the count values are read out by spending five cycles while asserting the select lines HSEL 0 to HSEL 4. However, the processing at the cycles of assertion of the select lines HSEL 1 to HSEL 3 has a different output sequence from that of the second embodiment. Specifically, the processing at the cycles of assertion in the orders of the select lines HSEL 1, HSEL 2, and HSEL 3 in the output sequence of the second embodiment shown in FIG. 9 is processed in the fourth embodiment while transposing the output sequence into the order of the select lines HSEL 2, HSEL 3, and HSEL 1. The processing at the cycles of assertion of the select lines HSEL 0 and HSEL 4 is the same as the processing in the second embodiment.

In the fourth embodiment, the serial data to be outputted from the saturation determination line 702 depending on the presence of saturation vary as follows:

Non-saturation of the W pixels in both of the Bayer units: 00000;

Saturation of the W pixel in the Bayer unit 1: 11000;

Saturation of the W pixel in the Bayer unit 2: 01100; and

Saturation of the W pixels in both of the Bayer units: 11100.

Accordingly, the image processing unit at the later stage can monitor the serial data on the saturation determination line 702 and determine that none of the Bayer units are saturated in the case where the value of the second cycle representing the assertion of the select line HSEL 1 has the value 0. Since the determination can be carried out in the second cycle, there is the time equivalent to two clocks of horizontal scanning prior to the fourth cycle, in which the control of the fifth cycle is to be settled. Thus, there is an extra one cycle as compared to the third embodiment.

Fifth Embodiment

The presence of saturation is detected by using the W pixels in the first embodiment. A fifth embodiment will describe a case of defining a typical four-pixel structure formed from RGGB as one Bayer unit.

Figure 14:
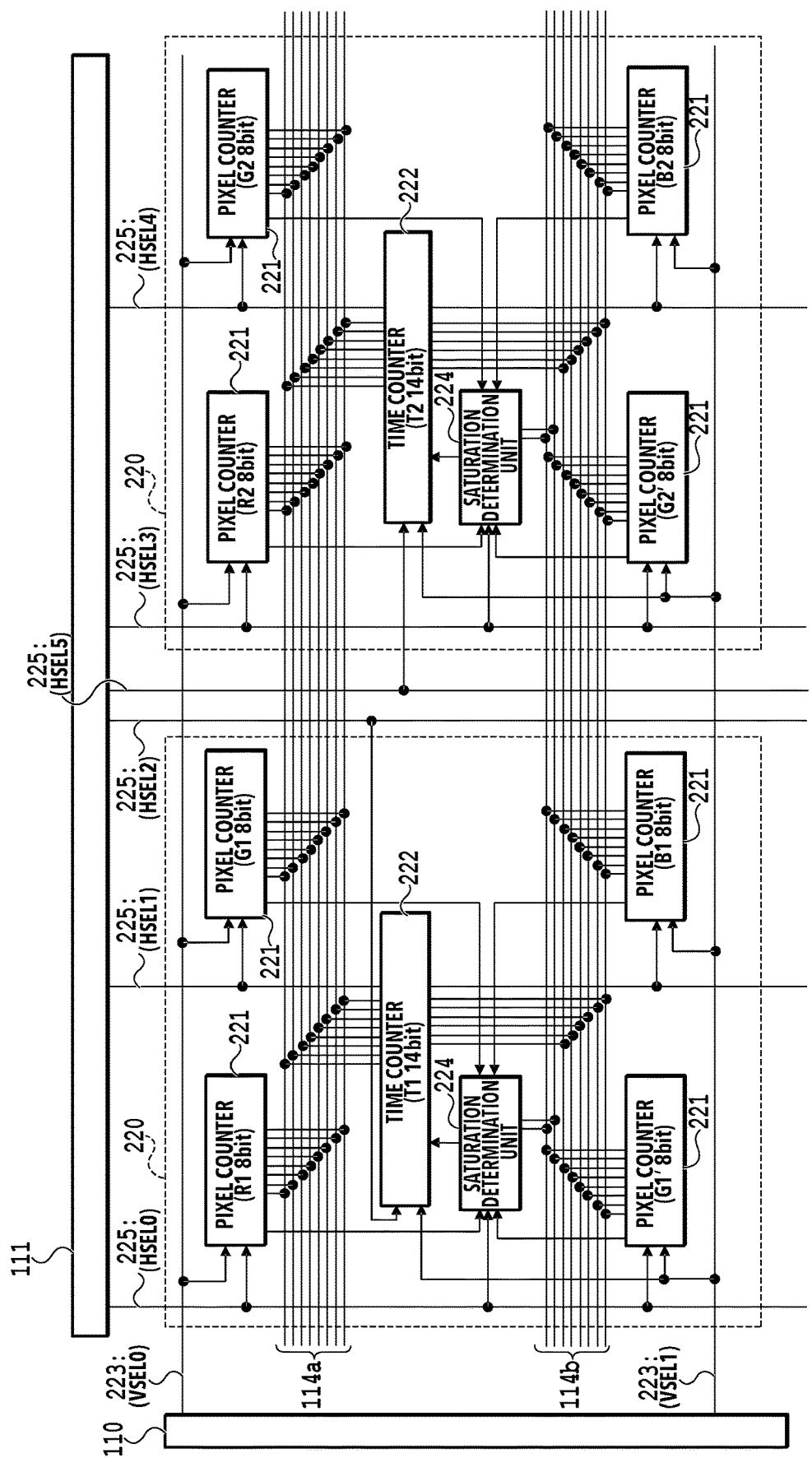
FIG. 14 is a diagram showing a configuration example of pulse processing units according to a fifth embodiment.

FIG. 14 is a diagram showing a configuration example of the pulse processing unit 220 according to the fifth embodiment. Note that the configuration of the fifth embodiment is the same as the configuration according to FIGS. 1 to 4 described in conjunction with the first embodiment, and explanations thereof will be omitted. FIG. 14 shows two pulse processing units 220 on the same row which are adjacent to each other. Each pulse processing unit 220 is formed from the pixel counter 221, the time counter 222, and the saturation determination unit 224. The basic operations of the pixel counter 221, the time counter 222, and the saturation determination unit 224 during the exposure period are the same as those in the first embodiment. Accordingly, the constituents are designated with the same reference signs and explanations thereof will be omitted.

However, in the fifth embodiment, the W pixels are replaced by typical G pixels. Accordingly, the configuration of the fifth embodiment includes pixel counters 221 (G1', G2') of G' pixels instead of the pixel counters 221 (W1, W2) of the W pixels. Moreover, saturation signals are coupled to the saturation determination unit 224 from all of the RGG'B pixels. Hence, at a point of saturation of the pixel counter of one of the pixels, the time counter 222 and the pixel counters 221 of the remaining pixels are stopped. Furthermore, the time counter 222 is formed into a 14-bit counter. Here, upper 8 bits are coupled to the data output line 114*a* of the upper 8-bit line while lower 6 bits are coupled to 6 bits out of the data output line 114*b* of the lower 8-bit line. Saturated pixel data indicating which pixels is saturated, which is retained by the saturation determination unit 224, is outputted to the remaining 2 bits of the data output line 114*b*. The saturated pixel data is outputted together with the lower 6 bits of the time counter 222 at the timing of assertion of the select line HSEL 0.

Figure 15:
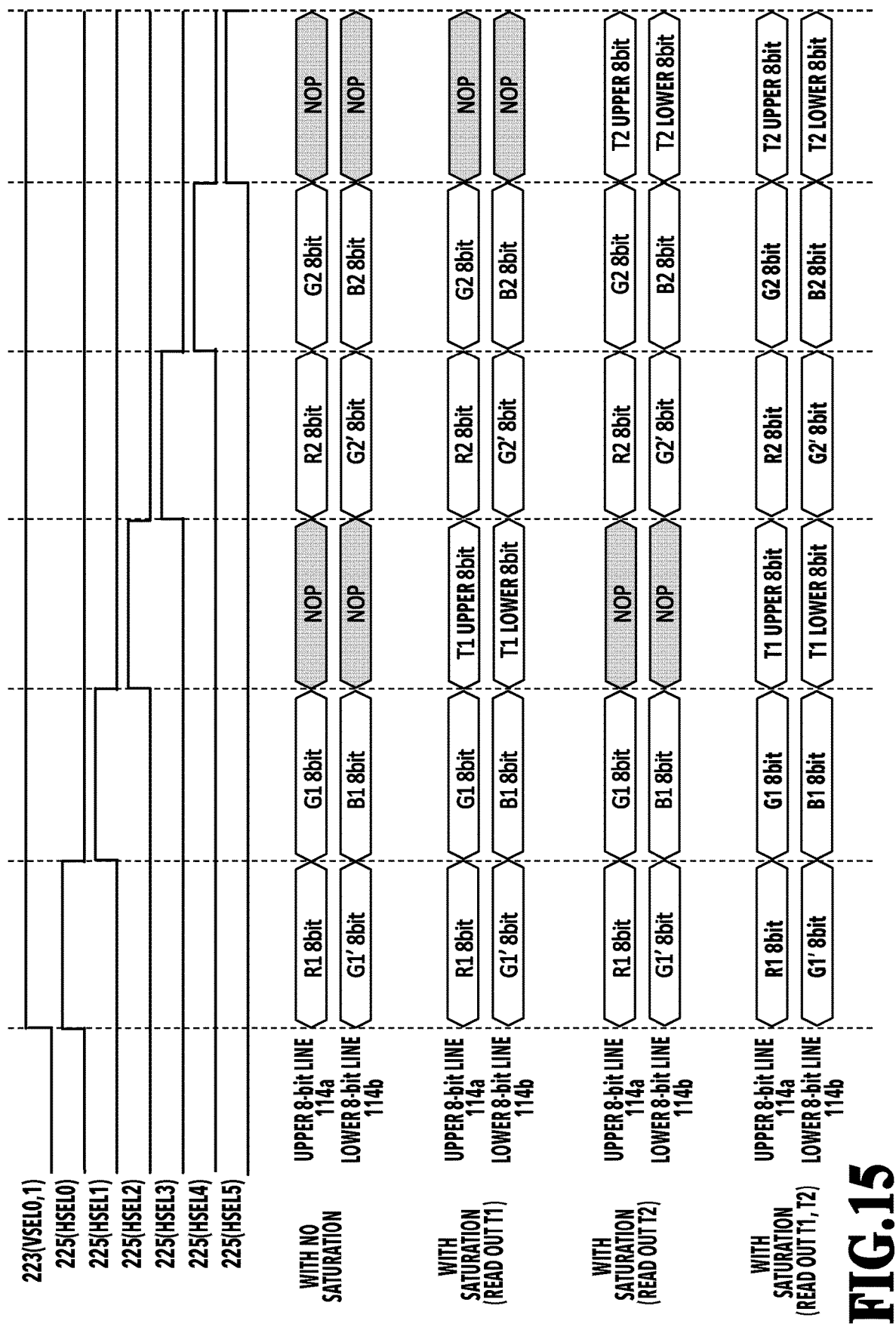
FIG. 15 is a diagram showing an output sequence according to the fifth embodiment.

FIG. 15 shows an output sequence of the pixel counters 221 and the time counters 222 according to the fifth embodiment. Regarding the output sequence of the pixel counters 221 and the time counters 222 according to the fifth embodiment, the output sequence of the first embodiment shown in FIG. 7 will be reworded as follows. In the case where none of the pixel counters 221 of the pixels are not saturated, the count value of the G' pixel counter is read out instead of the count value of W pixel counter. In the case where one of the pixel counters in the Bayer unit 1 is saturated, the count value is outputted from the time counter 222 (T1) at the cycle of assertion of the select line HSEL 2, and the pixel counter of the saturated pixel outputs NOP, for example. Likewise, in the case where one of the pixel counters in the Bayer unit 2 is saturated, the count value is outputted from the time counter 222 (T2) at the cycle of assertion of the select line HSEL 5, and the pixel counter of the saturated pixel outputs NOP, for example. In the case where one of the pixel counters in each of the Bayer units is saturated, the count values are outputted from the time counters 222 (T1, T2) at the cycles of assertion of the select lines HSEL 2 and HSEL 5, and the pixel counters of the saturated pixels in the respective Bayer units output NOP, for example.

As described above, according to the fifth embodiment, it is possible to reduce the circuit scale of the lines for the time counters even in the configuration of sensors formed from the typical RGGB pixels, by sharing the output line with the pixel counters and the time counters.

Sixth Embodiment

In the second to fifth embodiments, the readout time is reduced by transposing the output sequence across two Bayer units. A sixth embodiment will describe an average number of cycles of readout time reduction in a case of increasing the number of Bayer units.

In the case of the two Bayer units, there are four patterns of the output sequence and the numbers of required cycles as follows:

1. Non-saturation of the W pixels in both of the Bayer units (4 cycles);
2. Saturation of the W pixel in the Bayer unit 1 (5 cycles);
3. Saturation of the W pixel in the Bayer unit 2 (5 cycles); and
4. Saturation of the W pixels in both of the Bayer units: (5 cycles).

Accordingly, the average number of cycles turns out to be an average of 4.75 cycles in the case where these four patterns occur evenly, and there is a reduction effect of an average of 0.25 cycle relative to 5 cycles at the maximum.

In the case of three Bayer units, there are four patterns of the output sequence and the numbers of required cycles as follows:

1. Non-saturation of the W pixels in any of the Bayer units (3 Bayer units×4/2=6 cycles);

2. Saturation of the W pixel in one Bayer unit ({(3 Bayer units×4−1)+2}/2, roundup=6.5 cycles<7 cycles);

3. Saturation of the W pixels in two Bayer units ({(3 Bayer units×4−2)+4}/2, roundup=7 cycles); and 4. Saturation of the W pixels in three Bayer units ({(3 Bayer units×4−3)+6}/2, roundup=7.5 cycles<8 cycles).

Accordingly, the average number of cycles turns out to be an average of 7 cycles in the case where these four patterns occur evenly, and there is a reduction effect of an average of 1 cycle relative to 8 cycles at the maximum. This effect is larger than the case of controlling the two Bayer units.

Here, the number of readout cycles in the case of saturation in i Bayer units in the case of controlling N Bayer units can be calculated by:

the number of readout cycles={($N\times4-i$)+$i\times2$}/2, roundup.

As described above, the average number of cycles is also reduced in the case of increasing the controlled Bayer units subjected to transposition of the output sequence. This effect becomes larger as the controlled units are increased more.

According to the present embodiment, the output line is shared with the time counters and the pixel counters. Thus, it is possible to reduce the number of lines for the readout lines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-180309, filed Nov. 4, 2021 which is hereby incorporated by reference wherein in its entirety.

What is claimed is:

1. An apparatus which comprises a sensor in which a pixel including a conversion unit configured to detect incidence of a photon and a pulse processing unit configured to process a pulse generated by photon detection in the conversion unit are arranged two-dimensionally, the apparatus comprising:
    at least one processor; and
    a memory coupled to the at least one processor, the memory having instructions that, when executed by the processor, causes the at least one processor to function as:
    a time counter configured to count a clock from a start of exposure in one frame;
    pixel counters each configured to count the number of pulses from the start of exposure in the one frame; and
    an image processing unit configured to calculate respective pixel values based on the count values of the time counters and the pixel counters,
    wherein the time counter and the pixel counters share an output line, and exclusively output count values, respectively.

2. The apparatus according to claim 1, wherein
    the pulse processing unit outputs the count values of the time counter and the pixel counters in a time-divisional fashion at each cycle of assertion of a select line to select the pixels.

3. The apparatus according to claim 2, wherein
    the pulse processing unit further includes a determination unit configured to determine whether or not the count value of any of the pixel counters reaches a threshold within the one frame, and
    the pulse processing unit outputs the count value of the time counter to the output line instead of the count value of the pixel counter determined to reach the threshold, and transposes the cycle to output the count value of the time counter.

4. The apparatus according to claim 3, wherein the pulse processing unit skips the cycle to output the count value of the time counter in a case where there are no pixel counters determined to reach the threshold.

5. The apparatus according to claim 3, wherein
    the pixels are formed from four pixels of RGBW, and
    in the pulse processing unit, two pixel counters out of the four pixel counters of the pulse processing unit corresponding to the four pixels share a first output line and the remaining two pixel counters share a second output line, and output from the one time counter corresponding to the four pixels is coupled to the first and second output lines in a split manner.

6. The apparatus according to claim 5, wherein
the determination unit determines whether or not the pixel counter of the W pixel reaches the threshold, and
the pulse processing unit outputs a count value of the pixel counter of the W pixel in advance.

7. The apparatus according to claim 5, wherein
the four pixels are defined as one Bayer unit, and
the pulse processing units in two adjacent Bayer units transpose cycles to output the count values of the time counters and the pixel counters.

8. The apparatus according to claim 7, wherein
the pulse processing units in the adjacent Bayer units transpose the cycles to output the count values of the time counters and the pixel counters depending on whether or not the pixel counter of one of the W pixels reaches the threshold.

9. The apparatus according to claim 3, wherein
the pixels are formed from four pixels of RGGB, and
in the pulse processing unit, two pixel counters out of the four pixel counters of the pulse processing unit corresponding to the four pixels share a first output line and the remaining two pixel counters share a second output line, and output from the one time counter of the pulse processing unit corresponding to the four pixels is coupled to the first and second output lines in a split manner.

10. The apparatus according to claim 9, wherein the determination unit determines whether or not the count value of any of the four pixel counters reaches the threshold.

* * * * *